United States Patent
Kim et al.

(10) Patent No.: US 11,516,482 B2
(45) Date of Patent: Nov. 29, 2022

(54) ELECTRONIC DEVICE AND IMAGE COMPRESSION METHOD OF ELECTRONIC DEVICE

(71) Applicant: Samsung Electronics Co., Ltd., Gyeonggi-do (KR)

(72) Inventors: Do-Han Kim, Gyeonggi-do (KR); Jin-Min Bang, Gyeonggi-do (KR); Chang-Woo Lee, Gyeonggi-do (KR)

(73) Assignee: Samsung Electronics Co., Ltd

( * ) Notice: Subject to any disclaimer, the term of this patent is extended or adjusted under 35 U.S.C. 154(b) by 248 days.

(21) Appl. No.: 16/631,347

(22) PCT Filed: Jul. 11, 2018

(86) PCT No.: PCT/KR2018/007862
§ 371 (c)(1),
(2) Date: Jan. 15, 2020

(87) PCT Pub. No.: WO2019/017641
PCT Pub. Date: Jan. 24, 2019

(65) Prior Publication Data
US 2020/0221103 A1   Jul. 9, 2020

(30) Foreign Application Priority Data

Jul. 21, 2017   (KR) ......................... 10-2017-0092949

(51) Int. Cl.
*H04N 5/232*  (2006.01)
*H04N 19/167*  (2014.01)
(Continued)

(52) U.S. Cl.
CPC ........... *H04N 19/167* (2014.11); *G06V 10/10* (2022.01); *H04N 5/23229* (2013.01);
(Continued)

(58) Field of Classification Search
CPC .. H04N 19/167; H04N 19/17; H04N 5/23229; H04N 5/23293; H04N 5/23296; H04N 5/23212; G06K 9/78
See application file for complete search history.

(56) References Cited

U.S. PATENT DOCUMENTS

2001/0055064 A1   12/2001   Minakami
2005/0068421 A1   3/2005   Dutta et al.
(Continued)

FOREIGN PATENT DOCUMENTS

JP   2001-346095   12/2001
JP   2008005350   1/2008
(Continued)

OTHER PUBLICATIONS

PCT/ISA/210 Search Report issued on PCT/KR2018/007862, pp. 5.
(Continued)

*Primary Examiner* — Antoinette T Spinks
(74) *Attorney, Agent, or Firm* — The Farrell Law Firm, P.C.

(57) ABSTRACT

According to one embodiment of the present invention, an electronic device may comprise a processor and an image sensing module, wherein the image sensing module comprises an image sensor, and a control circuit electrically connected to the image sensor and connected to the processor through an interface, and the control circuit is configured to: acquire at least one raw image, using the image sensor; designate, for the at least one raw image, first data corresponding to a first region and second data not corresponding to the first region, on the basis of information related to the first region in the at least one raw image; transform the at least one raw image by changing at least a part of the second data to a designated value; and compress the at least one
(Continued)

transformed raw image and transmit the compressed transformed raw image to the processor.

12 Claims, 17 Drawing Sheets

(51) Int. Cl.
    *H04N 19/17*     (2014.01)
    *G06V 10/10*     (2022.01)

(52) U.S. Cl.
    CPC ..... *H04N 5/23293* (2013.01); *H04N 5/23296* (2013.01); *H04N 19/17* (2014.11); *H04N 5/23212* (2013.01)

(56) References Cited

U.S. PATENT DOCUMENTS

| | | |
|---|---|---|
| 2006/0017835 A1 | 1/2006 | Jacobsen |
| 2006/0104523 A1 | 5/2006 | Suzuki |
| 2008/0266444 A1 | 10/2008 | Jerdev |
| 2016/0277636 A1 | 9/2016 | Kawauchi |
| 2017/0171423 A1 | 6/2017 | Campbell et al. |

FOREIGN PATENT DOCUMENTS

| | | | |
|---|---|---|---|
| KR | 100714413 | | 5/2007 |
| KR | 20080035110 A | * | 4/2008 |
| KR | 1020080035110 | | 4/2008 |
| KR | 100858749 | | 9/2008 |
| KR | 20150072271 A | * | 6/2015 |
| KR | 101581688 | | 12/2015 |

OTHER PUBLICATIONS

PCT/ISA/237 Written Opinion issued on PCT/KR2018/007862, pp. 8.

Korean Office Action dated Aug. 4, 2021 issued in counterpart application No. 10-2017-0092949, 11 pages.

* cited by examiner

ELECTRONIC DEVICE AND IMAGE COMPRESSION METHOD OF ELECTRONIC DEVICE

PRIORITY

This application is a National Phase Entry of International Application No. PCT/KR2018/007862, which was filed on Jul. 11, 2018, and claims priority to Korean Patent Application No. 10-2017-0092949, which was filed on Jul. 21, 2017, the content of each of which is incorporated herein by reference.

TECHNICAL FIELD

Various embodiments of the present disclosure relate to a method and apparatus for compressing an obtained image in an image sensing module of an electronic device.

BACKGROUND ART

Along with the widespread of digital cameras, digital cameras have been recognized as electronic devices in everyday use. In addition, various electronic devices such as not only digital cameras, but also cellular phones, smartphones, etc., include cameras, and the public as well as experts increasingly use the cameras.

Consequently, recent electronic devices have essentially implemented image and data communication at high speed as well as voice communication and, especially, digital camera functions using an imaging module.

Among the digital camera functions used in the electronic device, functions required for basic photographing, storage, and transmission have been simply used initially, but to meet various demands of users, techniques for improving performance, quality, and functions have been developed. In particular, recently, systems increasing an output frame rate in a camera system have emerged, and such systems make it possible to provide users with various image processing and camera operations using a high-speed output image readout function.

Such high-speed output image systems employ a scheme to compress and transmit an image due to an interface speed or transmission power issue.

DETAILED DESCRIPTION OF THE INVENTION

Technical Problem

In a high-speed output image system, at least one raw image (e.g., an output frame) may be required for display or capturing, or at least one raw image (e.g., a hidden frame), though not used for display or capturing, may be required for internal use in the system for high-speed output image readout or auto focus (AF). The use of at least one raw image including the at least one output frame or the at least one hidden frame may increase total power and resources of the electronic device because an image sensing module has to additionally obtain and transmit the hidden frame as well as the output frame.

According to various embodiments of the present disclosure, there are provided an electronic device and an image compression method of the electronic device in which an image sensing module changes data of a second region (e.g., a non-region of interest (ROI)) except for a first region (e.g., an ROI) in at least one raw image including an output frame or a hidden frame into a designated value, and compresses and transmits the raw image to a processor, thereby reducing power consumption of and resources required for the electronic device.

Technical Solution

According to various embodiments, an electronic device includes a processor and an image sensing module including an image sensor and a control circuit electrically connected with the image sensor and connected with the processor through an interface, in which the control circuit is configured to obtain at least one raw image by using the image sensor, to designate the at least one raw image as first data corresponding to a first region and second data corresponding to a second region except for the first region, based on information associated with the first region in the at least one raw image, to convert the at least one raw image by changing at least a part of the second data into a designated value, and to compress the converted at least one raw image and transmit the compressed at least one raw image to the processor.

According to various embodiments, an image compression method of an electronic device includes obtaining at least one raw image by using an image sensor of the electronic device, designating the at least one raw image as first data corresponding to a first region and second data corresponding to a second region except for the first region, based on information associated with the first region in the at least one raw image, converting the at least one raw image by changing at least a part of the second data into a designated value, and compressing the converted at least one raw image.

According to various embodiments, an electronic device includes an electronic device including a processor and an image sensing module including an image sensor and a control circuit electrically connected with the image sensor and connected with the processor through an interface, in which the processor is configured to receive at least one compressed raw image from the image sensing sensor, to decompress the received at least one compressed raw image, to perform image processing with respect to the decompressed at least one raw image, and to display the image-processed at least one raw image on a display device of the electronic device.

Advantageous Effects

According to various embodiments, by changing data of a second region (e.g., a non-region of interest (ROI)) except for a first region (e.g., an ROI) in a raw image obtained in an image sensing module into a designated value, the amount of data to be compressed in compression of the raw image may be reduced, thereby reducing power consumption of the electronic device and resources required for compression.

According to various embodiments, the raw image may be compressed after, between first data corresponding to the first region and second data corresponding to the second region, the second data is changed into the designated value. Thus, total coordinates of the raw image after decompression may be maintained the same as those of the raw image before compression, such that the processor may not need separate location information for determining a location of the first region in the raw image in decompression of the compressed raw image. Moreover, total coordinates of the raw image after decompression are maintained the same as those of the raw image before compression, thereby compressing or decompressing a raw image in which second data corresponding to the second region is converted into a designated value and a raw image in which the second data corresponding to the second region is not converted, by using the same compression method.

According to various embodiments, the raw image may be an (image) frame including a plurality of lines, and may be compressed by controlling a compression rate set for each line in compression of the raw image. Consequently, in compression, by increasing a compression rate for a line having less data variation and lowering a compression rate for a line having much data variation in a frame of the raw image for each line based on a target compression rate, image quality may be maintained and at the same time, the target compression rate may be achieved.

According to various embodiments, compression of the raw image may be controlled for each line, based on the interface speed of the image sensing module or the interface speed of the processor. Hence, when the image sensing module transmits the compressed raw image to the processor, the possibility of a transmission failure may be reduced and a data loss may be prevented.

MODE FOR CARRYING OUT THE INVENTION

Figure 1:
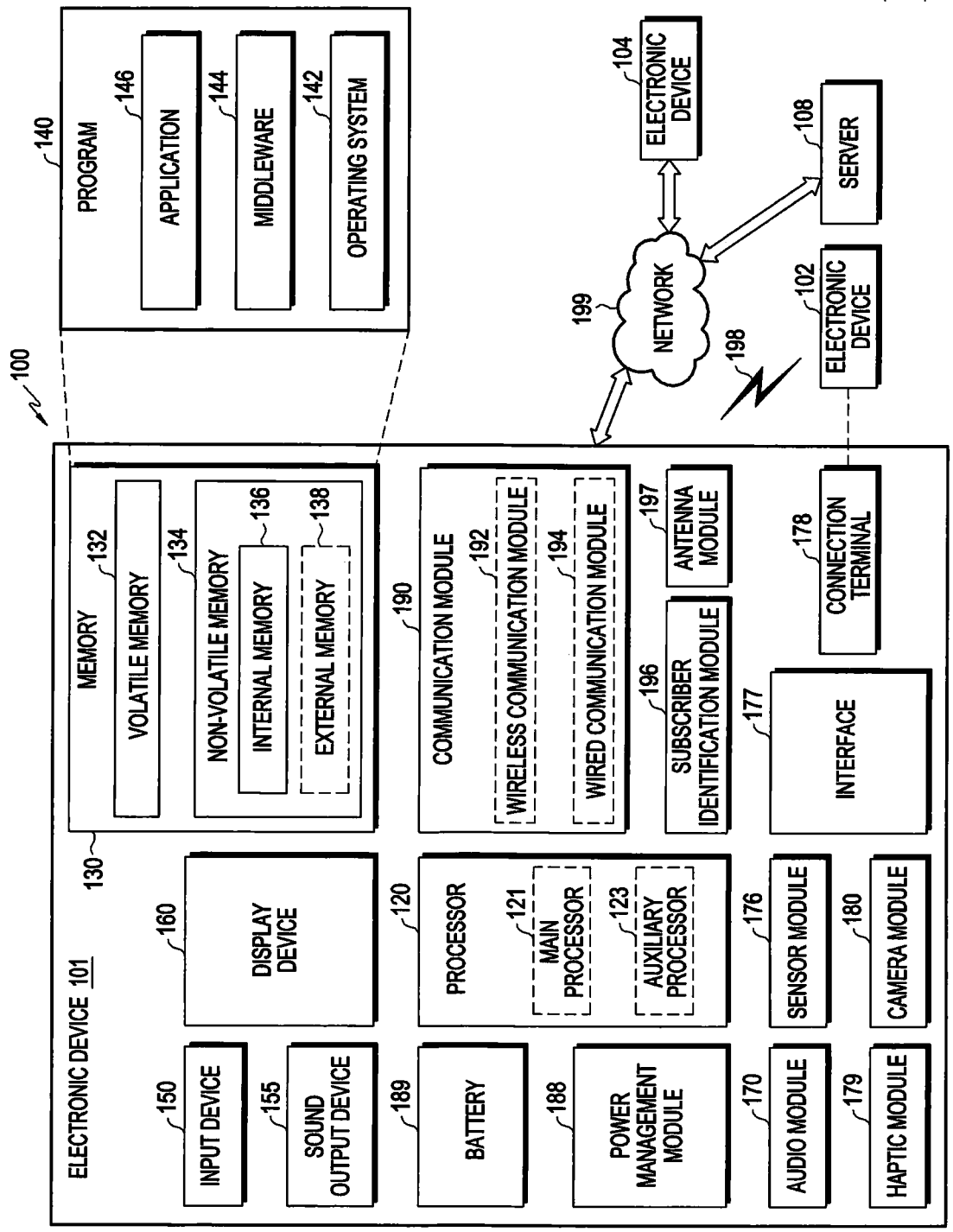
FIG. 1 is a block diagram of an electronic device for compressing an image in a network environment, according to various embodiments.

FIG. 1 is a block diagram illustrating an electronic device 101 for compressing an image in a network environment 100 according to various embodiments. Referring to FIG. 1, the electronic device 101 in the network environment 100 may communicate with an electronic device 102 via a first network 198 (e.g., short-range wireless communication), or an electronic device 104 or a server 108 via a second network 199 (e.g., long-range wireless communication). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or other components may be added in the electronic device 101. In some embodiment, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor (AP)) and an auxiliary processor 123 that is operable independently from the main processor 121. In addition to, or instead of, the main processor 121, the auxiliary processor 123 may include an auxiliary processor 123 (e.g., a graphics processing unit (GPU), an image signal processor, a sensor hub processor, or a communication processor) that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120) of the electronic device 101, e.g., software (e.g., the program 140) and input data or output data for a command related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving a command or data, which is to be used for a component (e.g., the processor 120) of the electronic device 101, from an outside (e.g., a user) of the electronic device 101. The input device 50 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display 160 may include a touch circuitry or a pressure sensor capable of measuring the strength of a pressure with respect to a touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) wiredly or wirelessly coupled with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., an HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and the external electronic device (e.g., the electronic device 102, the electronic device 104, or the server 108) and performing communication via the established communication channel. The communication module 190 may include one or more communication processors that are operated independently from the processor 120 (e.g., an application processor) and supports wired or wireless communication. According to an embodiment, the communication module 190 may include a wireless communication module 192 (e.g., a cellular communication module, a short-range wireless communication module, or a GNSS communication module) or a wired communication module 194 (e.g., an LAN communication module or a power-line communication module), and may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., an LAN or wide area network (WAN)). The above-enumerated types of communication modules 190 may be implemented in a single chip, where at least some of the modules are integrated, or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, some or all of operations performed by the electronic device 101 may be performed in another electronic device or a plurality of other electronic devices. According to an embodiment, when the electronic device 101 has to perform a function or a service automatically or at a request, the electronic device 101 may request an external electronic device to perform at least some functions associated with the function or the service, instead of or in addition to executing the function or the service. The external electronic device having received the request may execute the requested function or additional function and deliver the execution result to the electronic device 101. The electronic device 101 may then process or further process the received result to provide the requested function or service. To that end, a cloud computing, distributed computing, or client-server computing technology may be used, for example.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). When it is described that an element (such as a first element) is "operatively or communicatively coupled with/to" or "connected" to another element (such as a second element), the element can be directly connected to the other element or can be connected to the other element through another element (e.g., a third element).

A term "module" used herein may mean, for example, a unit including one of or a combination of two or more of hardware, software, and firmware, and may be used interchangeably with terms such as logic, a logic block, a part, or a circuit. The module may be a single integral component, or a minimum unit or part thereof, adapted to perform one or more functions. For example, the module may be implemented as an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). The machine may invoke stored instructions from the storage medium and operate according to the invoked instructions, and may include an electronic device (e.g., the electronic device 101) according to the disclosed embodiments. When the instructions are executed by a processor (for example, the processor 120), the processor may perform functions corresponding to the instructions. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and one or more of the above-described components may be omitted, or one or more other components may be added. Alternatively or additionally, a plurality of components (e.g., modules or programs) may be integrated into a single component, and the integrated component may still perform one or more functions of each of the plurality of components in the same or similar manner as they are performed by a corresponding one of the plurality of components before the integration. Operations performed by the module, the program, or another component according to various embodiments may be carried out sequentially, in parallel, repeatedly, or heuristically, or one or more of the operations may be executed in a different order or omitted, or one or more other operations may be added.

Figure 2:
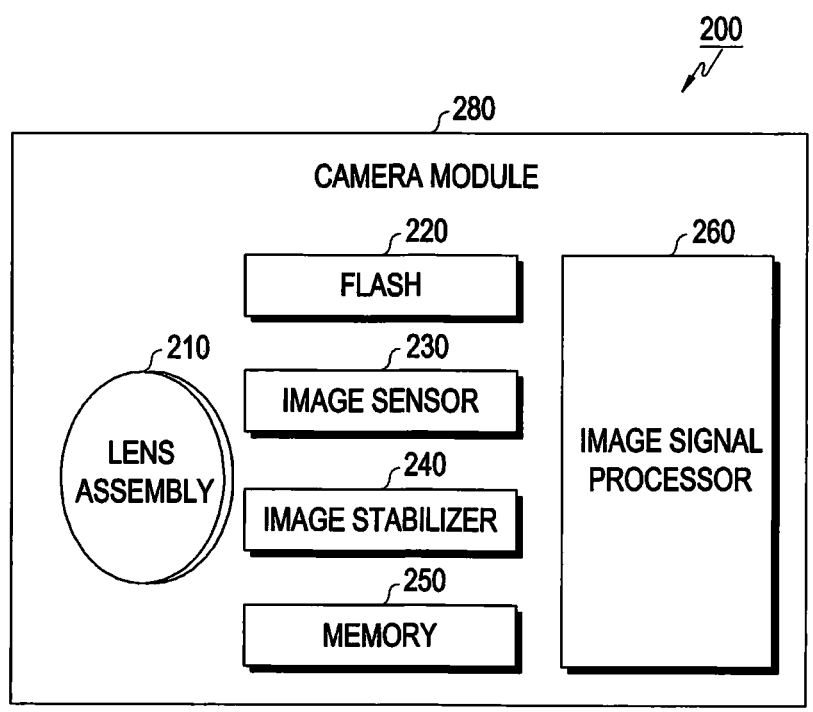
FIG. 2 is a block diagram of a camera module for compressing an image according to various embodiments.

FIG. 2 is a block diagram 200 of the camera module 280 for compressing an image, according to various embodiments. Referring to FIG. 2, the camera module 280 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 280 may include a plurality of lens assemblies 210. In such a case, the camera module 280 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have at least one lens attributes different from those of another lens assembly. The lens assembly 210 may include, for example, a wide-angle lens or a telephoto lens. The flash 220 may emit light that is used to reinforce light reflected from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted from the object and transmitted via the lens assembly 210 into an electrical signal. According to an embodiment, the image sensor 230 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charge coupled device (CCD) sensor or a complementary metal oxide semiconductor (CMOS) sensor.

The image stabilizer 240 may move or control (e.g., adjust read-out timing) at least one lens included in the lens assembly 210 or the image sensor 230 to at least partially compensate for a negative influence (e.g., image blurring) of movement of the camera module 280 or the electronic device 101 including the same upon a captured image in response to the movement. According to an embodiment, the image stabilizer 240 may be implemented with, for example, an optical image stabilizer, and may sense such a movement using a gyro sensor (not shown) or an acceleration sensor (not shown) disposed inside or outside the camera module 280.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 160. According to an embodiment, the memory 250 may be configured as at least part of the memory 130 or as a separate memory that is operated independently from the memory 130.

The image signal processor 260 may perform image processing (e.g., depth map generation, three-dimensional (3D) modeling, panorama generation, feature point extraction, image synthesizing, or image compensation (e.g., noise reduction, resolution adjustment, brightness adjustment, blurring, sharpening, or softening)) on an image obtained by the image sensor 230 or an image stored in the memory 250. Additionally or alternatively, the image signal processor 260 may perform control (e.g., exposure time control or read-out timing control) with respect to at least one (e.g., the image sensor 230) of the components included in the camera module 280. An image processed by the image signal processor 260 may be stored back in the memory 250 for further processing, or may be provided to an external component (e.g., the memory 130, the display device 160, the electronic device 102, the electronic device 104, or the server 108) outside the camera module 280. According to an embodiment, the image signal processor 260 may be configured as at least part of the processor 120, or as a separate processor that is operated independently from the processor 120. When the image signal processor 260 is configured as a separate processor, images processed by the image signal processor 260 may be displayed, by the processor 120, via the display device 160 as it is or after being further processed.

According to an embodiment, the electronic device 101 may include two or more camera modules 280 having different attributes or functions. In this case, for example, at least one camera module 280 may be a wide-angle camera or a front camera, and at least one other camera module may be a telescopic camera or a rear camera.

Figure 3A:
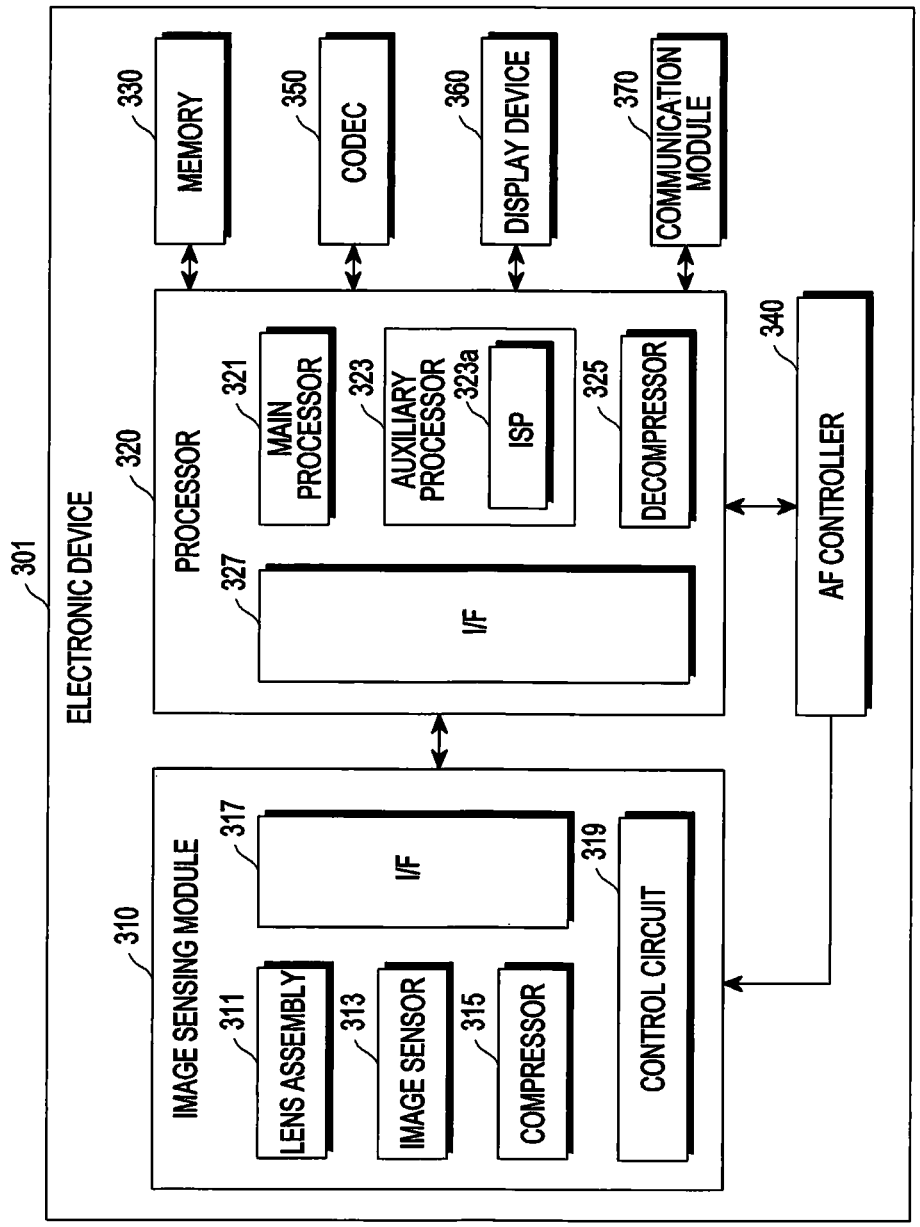
FIG. 3A is a block diagram of an electronic device for compressing an image, according to various embodiments.

FIG. 3A is a block diagram of an electronic device 301 for compressing an image, according to various embodiments of the present disclosure.

Referring to FIG. 3A, the electronic device 301 may include at least one of an image sensing module 310, a processor 320, a memory 330, an AF controller 340, a codec 350, a display device 360, or a communication module 370. Although only components related with an embodiment of the disclosure are illustrated in FIG. 3A, other components than the foregoing or illustrated components may also be included. For example, the electronic device 301 shown in FIG. 3A may include the entire electronic device 101 illustrated in FIG. 1 or a part thereof.

The image sensing module 310 (e.g., the camera module 180 or the camera module 280) may obtain at least one raw image, compress the obtained at least one raw image, and transmit the compressed at least one raw image to the processor 320 (e.g., the processor 120), and may include at least one of a lens assembly 311, an image sensor 313, a compressor 315, an interface (I/F) 317, or a control circuit 319.

The lens assembly 311 (e.g., the lens assembly 210) may be moved such that an interval with the image sensor 313 (e.g., the image sensor 230) may be adjusted. For example, the lens assembly 311 may be moved such that a focus point between the lens assembly 311 and the image sensor 313 may be adjusted with respect to a distance from a photographing target (e.g., an object such as a person, a building, an object, a background, etc.).

The image sensor 313 (e.g., the image sensor 230) may obtain at least one raw image under control of the control circuit 319 (e.g., the image signal processor 260). According to an embodiment, the image sensor 313 may include an array of a plurality of pixels (e.g., a pixel array of n×m, in which n and m are natural numbers), and the at least one raw image obtained using the image sensor 313 may include data (e.g., a pixel value) corresponding to each of the array of the plurality of pixels by using the image sensor 313.

According to an embodiment of the disclosure, the image sensor 313 may include at least one of, for example, a complementary metal-oxide-semiconductor (CMOS) sensor, a charge coupled diode (CCD) sensor, a Foveon sensor, or a complementary image sensor.

The compressor 315 may compress the at least one raw image under control of the control circuit 319. The compressor 315 may compress the at least one raw image frame-by-frame or line-by-line of each frame, based on at least one of a frame compression rate that is set frame-by-frame or a line compression rate that is set line-by-line of a frame.

The I/F 317 may transmit the compressed at least one raw image to the processor 320 (e.g., the processor 120) based on an interface speed of the I/F 317 under control of the control circuit 319. For example, the I/F 317 may transmit the compressed at least one raw image to the processor 320 frame-by-frame or line-by-line of each raw image frame, based on the interface speed of the I/F 317.

The control circuit 319 may control at least one of components (e.g., the lens assembly 311, the image sensor 313, the compressor 315, or the I/F 317) of the image sensing module 310. The control circuit 319 may include at least one processor. For example, the control circuit 319 may include the image signal processor 260 shown in FIG. 2.

The control circuit 319 may obtain the at least one raw image by using the image sensor 313.

According to an embodiment, the at least one raw image may include a first raw image or a second raw image. The first raw image may include a hidden frame, and the second raw image may include an output frame. For example, the hidden frame may mean a frame that is not used for display or capturing, but may be internally used in the system for high-speed output image readout or AF, and the hidden frame may not be provided or output to the user. The output frame may be used for display or capturing, and thus may be output on a display. For example, the control circuit 319 may not output the first raw image through the display device 360, and may output the second raw image through the display device 360.

According to an embodiment, each raw image (e.g., a hidden frame or an output frame) may include a plurality of (data) lines, in which each line of each raw image may include data corresponding to a plurality of pixels arranged in m columns corresponding to each row (e.g., n rows) among the array of the plurality of pixels of the image sensor 313. For example, when the image sensor 313 includes an array of a plurality of pixels n×m (n and m are natural numbers), the plurality of lines of each raw image may include n (data) lines corresponding to n rows and each line may include data corresponding to m pixels arranged in m columns.

The control circuit 319 may obtain the first region in the at least one raw image. According to an embodiment, the at least one raw image may include one or more objects.

According to an embodiment, the first region may be a region of interest (ROI) region. According to an embodiment, the first region may include at least one ROI region. According to an embodiment, the first raw image and the at least one second raw image may include one or more objects.

According to an embodiment, the control circuit 319 may obtain a region focused by various AF operations (e.g., contrast AF, depth from defocus (DFD) AF, continuous AF, etc.) performed using the image sensing module 310, and designate the obtained focused region as the first region (e.g., the ROI region). The control circuit 319 may obtain information about the focused region as information associated with the first region.

According to an embodiment, the control circuit 319 may obtain at least one object region recognized by an object recognition operation in the at least one raw image, and designate the obtained at least one object region as the first region. For example, the object recognition operation may be performed using known various face or object recognition techniques. The control circuit 319 may obtain information about the recognized face or object region as information associated with the first region.

According to an embodiment, the control circuit 319 may receive information about the designated region from the processor 320. The control circuit 319 may obtain a region corresponding to the information about the designated region from the at least one raw image, and designate the obtained region as the first region. For example, the information about the designated region may include location information (e.g., location coordinates on the display device 360) or region size information. According to an embodiment, the location information and the region size information may be input as designated values by the user, may be previously set internally in the system, or may be input by a user's touch. For example, the information about the designated region may be information estimated for the next first region by the processor 320. The control circuit 319 may obtain information about the region obtained corresponding to the information about the designated region, as information associated with the first region.

According to an embodiment, the control circuit 319 may receive information about a designated location from the processor 320. The control circuit 319 may obtain a region corresponding to the information about the designated location from the at least one raw image, and designate the obtained region as the first region. For example, when the size of the first region is preset, the control circuit 319 may obtain a region corresponding to the designated size based on the information about the designated location (e.g., location coordinates or center coordinates on the display device 360) in the at least one raw image, and designate the obtained region as the first region. The control circuit 319 may obtain information about the region obtained corresponding to the information about the designated region, as the information associated with the first region.

According to an embodiment, the control circuit 319 may receive digital zoom information (e.g., center location information and magnification information) corresponding to a digital zoom operation from the processor 320. The control circuit 319 may obtain a region corresponding to the digital zoom information (e.g., the center location information and the magnification information) from the at least one raw image, and designate the obtained region as the first region. For example, the digital zoom information may include center location information (e.g., location coordinates on the display device 360) or magnification information, to be enlarged by digital zooming. According to an embodiment, the center location information or the magnification information to be enlarged by digital zooming may be input as a designated value by the user, may be previously set internally in the system (e.g., the center of a corresponding raw image), or may be input by a user's touch. The control circuit 319 may obtain, as the information associated with the first region, a region of a size corresponding to the magnification information with respect to the center location information to be enlarged by digital zooming in the at least one raw image. For example, when the center location information indicates the center of the at least one raw image and the magnification information indicates 200%, the control circuit 319 may obtain a region corresponding to ½ of each of a width and a height of the at least one raw image with respect to the center of the at least one raw image in the at least one raw image, and obtain information about the obtained region as the information associated with the first region.

The control circuit 319 may designate the at least one raw image as first data corresponding to the first region and second data corresponding to the second region (e.g., a non-ROI) except for the first region, based on the information associated with the first region. According to an embodiment, the first data and the second data may include a pixel value (e.g., a luminance) corresponding to each pixel in the at least one raw image.

The control circuit 319 may determine a designated value for the second data.

According to an embodiment, the control circuit 319 may determine a default value preset in the system as the designated value for the second data. The default value may be stored in the memory 330 or a memory (e.g., the memory 250) in the image sensing module 310 electrically connected with the control circuit 319.

According to an embodiment, the control circuit 319 may determine the default value for the second data, based on at least a part of the first data. For example, the control circuit 319 may calculate an average value of the first data and determine the calculated average value as the designated value for the second data. For example, when the calculated average value is 100 in a pixel value range of 0-255, and a designated pixel value range is designated as ±10, the designated value x for the second data may be determined as one in a range of 90<x<100 or 100<x<110.

According to an embodiment, the at least one raw image is a (image) frame including a plurality of lines, and the control circuit 319 may determine the designated value for the second data included in each line based on at least a part of the first data included in each line of the at least one raw image. For example, the control circuit 319 may determine the designated value for the second data included in a first line among the plurality of lines of the at least one raw image based on at least a part of the first data corresponding to the first line (e.g., an average value of the first data included in the first line), and the designated value for the second data included in a second line among the plurality of lines of the at least one raw image as a second value based on at least a part of the first data corresponding to the second line (e.g., an average value of the first data included in the second line).

The control circuit 319 may convert the at least one raw image by changing the second data in the at least one raw image into the determined designated value. According to an embodiment, the control circuit 319 may convert the at least one raw image by changing a designated value for the second data corresponding to the first line among the plurality of lines of the at least one raw image into the determined first value and changing the designated value for the second data corresponding to the second line among the plurality of lines into the determined second value. The control circuit 319 may generate the converted at least one raw image including the first data and the second data that has been changed into the first value and the second value. The control circuit 319 may transmit the converted at least one raw image to the processor 320.

According to an embodiment, the control circuit 319 may compress the converted at least one raw image frame-by-frame or line-by-line of each frame and transmit the compressed image to the processor 320.

According to an embodiment, the control circuit 319 may set a frame compression rate and compress the converted at least one raw image based on the set frame compression rate. The control circuit 319 may transmit the compressed at least one raw image to the processor 320 frame-by-frame.

According to an embodiment, the control circuit 319 may set a frame compression rate, and may set a line compression rate for each line of the converted at least one raw image based on at least one of the set frame compression rate, the interface speed of the I/F 317 of the image sensing module 310, or the interface speed of an I/F 327 of the processor 320. The control circuit 319 may compress the converted at least one raw image for each line based on the set line compression rate. The control circuit 319 may transmit the at least one raw image compressed for each line to the processor 320 line-by-line.

The processor 320 may control the electronic device 301 overall. According to an embodiment, the processor 320 may decompress the compressed at least one raw image from the image sensing module 310 and perform image processing on the decompressed image, and the processor 320 may include, for example, at least one of a main processor 321, an auxiliary processor 323, a decompressor 325, or the I/F 327. The processor 320 may include the processor 120 illustrated in FIG. 1 or a part thereof.

The main processor 321 (e.g., the main processor 121) may receive the compressed at least one raw image from the image sensing module 310 through the I/F 327. According to an embodiment, the main processor 321 may receive the compressed at least one raw image frame-by-frame or line-by-line of the frame, based on the interface speed of the I/F 327.

The main processor 321 may decompress the compressed at least one raw image by using the decompressor 325. The main processor 321 may generate the at least one raw image by decompressing the compressed at least one raw image frame-by-frame or line-by-line of the frame, using the decompressor 325. The decompressed at least one raw image may include at least one raw image in which the second region (e.g., a non-ROI) except for the first region (e.g., an ROI) is changed into a designated value.

The main processor 321 may determine whether each of the decompressed at least one raw image is the converted at least one raw image in which the second region (e.g., a non-ROI) except for the first region (e.g., an ROI) is changed into a designated value.

When determining that the raw image is the converted raw image in which the second region is changed into the designated value, the main processor 321 may obtain the first region (e.g., the ROI) from the converted raw image. For example, the main processor 321 may obtain the first region corresponding to the first data from the converted at least one raw image. The main processor 321 may estimate the first region (e.g., a next ROI) in at least one raw image to be obtained through the image sensing module 310, based on the first region. The main processor 321 may transmit information about the estimated first region to the image sensing module 310.

The main processor 321 may transmit information associated with the first region (e.g., the ROI) in the at least one raw image to be obtained in the image sensing module 310 to the image sensing module 310. According to an embodiment, the information associated with the first region may include at least a part of information about an object recognized by object recognition in the at least one raw image, information about the designated region, information about the designated location, or digital zoom information (e.g., center location information and magnification information).

According to various embodiments, the main processor 321 may be an application processor.

The main processor 321 may obtain additional information to be additionally provided to components in the electronic device 301 including the image sensing module 310 by using at least one hidden frame or at least one output frame.

According to various embodiments, the additional information may be obtained using various combinations of at least one hidden frame or at least one output frame according to execution of an operation or application related to the image sensing module 310.

According to an embodiment, the additional information may include lens position information, motion information, or pixel control information. For example, the lens position information may include a position of the lens assembly 311 focused by AF (e.g., contrast AF or DFD AF) or a position of the lens assembly 311 focused by AF (e.g., continuous AF) for at least one object detected by motion detection. The motion information may include an object region for an object having a motion among at least one object, a motion direction, location information, etc. The pixel control information may include exposure control information including an exposure time, an exposure sensitivity, or illumination environment information for controlling the amount of exposure for each pixel of the image sensor 313, resolution control information for controlling a resolution, etc.

According to various embodiments, the lens position information may be obtained by various combinations of at least one hidden frame or at least one output frame.

According to an embodiment, the main processor 321 may obtain lens position information (e.g., a position of the lens assembly 311) focused on at least one object or at least a partial region (e.g., the first region) using a plurality of raw images obtained moving the position of the lens assembly 311, by using the control circuit 319 of the image sensing module 310 in a contrast AF operation. For example, the main processor 321 may compare a contrast of the plurality of raw images obtained moving the position of the lens assembly 311 and obtain the position of the lens assembly 311 corresponding to a raw image having the highest contrast as the lens position information, by using the control circuit 319 of the image sensing module 310. The plurality of raw images used in the contrast AF may include at least one hidden frame or at least one output frame.

According to an embodiment, the main processor 321 may obtain lens position information (e.g., a position of the lens assembly 311) focused on at least one object or at least a partial region (e.g., the first region) using two raw images having different positions of the lens assembly 311, by using the control circuit 319 of the image sensing module 310 in a DFD AF operation. For example, the DFD AF operation includes AF performed based on a feature that a raw image obtained in case of defocus, i.e., when the lens assembly 311 is in an out-of-focus may have bokeh, and the degree of bokeh may differ with a distance between the lens assembly 311 and the image sensor 313. Therefore, the control circuit 319 may calculate a focused point based on at least two raw images obtained in different positions of the lens assembly 311 in the DFD AF operation. For example, bokeh information corresponding to a distance between the lens assembly 311 and the image sensor 313 based on performance of the image sensing module 310 may be preset. The preset bokeh information may be previously stored in the memory 330, and may be used as a reference value in the DFD AF operation. For example, the control circuit 319 may calculate a position of the lens assembly 311 focused on at least one object or at least a partial region (e.g., the first region) by comparing the bokeh of the at least two raw images obtained in different positions of the lens assembly 311 with the preset bokeh information in the DFD AF operation. The control circuit 319 may obtain the calculated position of the lens assembly 311 as the lens position information. The at least two raw images used in the DFD AF may include at least one hidden frame or at leak one output frame.

According to an embodiment, the main processor 321 may obtain lens position information (e.g., a position of the lens assembly 311) focused on a region corresponding to the detected at least one object using a plurality of raw images obtained at different frame rates, by using the control circuit 319 of the image sensing module 310 in AF (e.g., contrast AF) with respect to at least one object detected by motion detection. For example, the control circuit 319 may obtain continuous frames like video taking or the plurality of raw images obtained at different frame rates through the image sensor 313 in high-speed image capturing. A frame may detect a motion (movement) for the at least one object based on at least two different raw images. For example, the main processor 321 may detect motion information including a region, a motion direction, etc., corresponding to at least one object having a motion by comparison among raw images obtained at a first frame rate (e.g., 30 fps), comparison among raw images obtained at a second frame rate (e.g., 60 fps), or comparison between a raw image obtained at the first frame rate and a raw image obtained at the second frame rate, by using the control circuit 319 of the image sensing module 310. The control circuit 319 may obtain, as the lens position information, positions of the lens assembly 311 continuously focused on the at least one object based on the detected motion information. The plurality of raw images used in AF (e.g., contrast AF) may include at least one hidden frame or at least one output frame.

According to various embodiments, the pixel control information may be obtained by various combinations of at least one hidden frame or at least one output frame.

According to an embodiment, the main processor 321 may obtain exposure control information including an exposure time or an exposure sensitivity for obtaining a plurality of raw images with different amounts of exposure to respective pixels of the image sensor 313 in high dynamic range (HDR) image generation. For example, the main processor 321 may determine an exposure time or an exposure sensitivity for a pixel corresponding to the at least a part of the raw image of the image sensor 313 to adjust the amount of exposure to at least a part of at least one raw image of a short-exposure raw image or a long-exposure raw image obtained through the image sensor 313 in HDR image generation. The main processor 321 may determine the exposure time or the exposure sensitivity based on lighting environment information to adjust the amount of exposure. The lighting environment information may include information (e.g., an illumination value) corresponding to a lighting environment where the at least one raw image is obtained. The main processor 321 may obtain the determined exposure time or exposure sensitivity as the exposure control information. To re-adjust the amount of exposure with respect to at least a partial region of at least one raw image of the short-exposure raw image or the long-exposure raw image obtained in generation of the HDR image, the plurality of raw images obtained through the image sensing module 310 may include at least one hidden frame or at least one output frame.

According to an embodiment, the main processor 321 may obtain resolution control information for obtaining at least one raw image of a resolution that is different from a resolution of a digital-zoomed raw image to adjust the resolution of the digital-zoomed raw image in a digital zoom operation. For example, by using the control circuit 319 of the image sensing module 310, to improve a resolution of the digital-zoomed raw image, the main processor 321 may determine a resolution of at least one raw image to be obtained through the image sensor 313 as a resolution higher than the resolution of the digital-zoomed raw image. The main processor 321 may obtain the determined resolution as the resolution control information. To control the resolution of the digital-zoomed raw image in the digital zoom operation, the at least one image obtained through the image sensing module 310 may include at least one hidden frame or at least one output frame.

In various AF operations, motion detection, HDR image generation, or digital zoom operation, at least one raw image obtained based on the additional information may include at least one hidden frame or at least one output frame, and when the at least one hidden frame is displayed on the display device 360 or used for capturing, wobbling may be generated. To prevent wobbling from being generated, the processor 320 may use the at least one hidden frame for internal use in the electronic device 301, for example, to calculate an AF point according to various AF schemes, detect a motion (movement) of at least one object, adjust a resolution in the digital zoom operation, or adjust the amount of exposure in HDR image generation, and may display the at least one hidden frame on the display 360 or may not use the at least one hidden frame for capturing.

According to an embodiment, the main processor 321 may provide the obtained additional information to the image sensing module 310. For example, the main processor 321 may provide lens position information, motion information, or pixel control information of the additional information to the control circuit 319 of the image sensing module 310. The control circuit 319 may obtain at least one raw image based on the additional information. For example, the control circuit 319 may control the lens assembly 311 or the image sensor 313 in the image sensing module 310 based on the obtained additional information and obtain at least one new raw image by using the controlled lens assembly 311 or image sensor 313. According to an embodiment, the main processor 321 may provide the additional information to various applications. For example, the main processor 321 may execute various applications related to a motion-detected object by using the motion information of the additional information.

To obtain the additional information, various ways to combine at least one output frame or at least one hidden frame will be described with reference to FIGS. 4A through 4D.

The auxiliary processor 323 (e.g., the auxiliary processor 123) may perform image-processing with respect to the first region (e.g., the ROI) in the converted at least one raw image. The auxiliary processor 323 may perform image processing with respect to the decompressed at least one raw image. According to an embodiment, the image processing may include gamma correction, interpolation, spatial change, image effect, image scale, auto white balance (AWB), auto exposure (AE), auto focus (AF), etc.

According to an embodiment, the auxiliary processor 323 may include an image signal processor (ISP) 323a.

The main processor 321 or the auxiliary processor 323 may display the converted at least one raw image that is image-processed by the auxiliary processor 323 (e.g., the ISP 323a) or the at least one raw image (the second region (e.g., the non-ROI) except for the first region is not converted) on the display 360.

The main processor 321 or the auxiliary processor 323 may generate at least one display image to be displayed on the display device 370, based on the first region of the converted at least one raw image that is image-processed by the auxiliary processor 323 (e.g., the ISP 323a) or the image-processed at least one raw image (the second region (e.g., the non-ROI) except for the first region is not converted) on the display 360. According to an embodiment, the main processor 321 or the auxiliary processor 323 may generate a display image by enlarging the image-processed first region (e.g., a region (e.g., an ROI D of FIG. 5D) corresponding to magnification information of digital zoom in the raw image) according to a magnification of digital zooming in the digital zoom operation. According to an embodiment, the main processor 321 or the auxiliary processor 323 may generate a display image (e.g., an HDR image) by using the short-exposure raw image or the long-exposure raw image to generate the HDR image of the decompressed at least one raw image. The main processor 321 may display the generated at least one display image on the display device 360.

The memory 330 may include the entire memory 130 illustrated in FIG. 1 or the entire memory 250 illustrated in FIG. 2, or a part of the memory 130 or 250. The memory 330 may include an image buffer that stores the at least one raw image obtained from the image sensing module 310 frame-by-frame. The memory 330 may store information about a first region (e.g., a focused region, an object region, a region corresponding to a designated region, a region corresponding to a designated position, or a region corresponding to a magnification of digital zooming) for the at least one raw image obtained through the image sensing module 310.

According to an embodiment, the memory 330 may store the first data corresponding to the first region in the at least one raw image and second data that does not corresponding to the first region. The memory 330 may store a designated value for the second data. The memory 330 may store at least one raw image converted by the change of the second data in the at least one raw image into the designated value.

According to an embodiment, the memory 330 may store a temporary operation value generated in a process of determining the designated value for the second data in the at least one raw image and a temporary operation value generated in a process of changing the second data in the at least one raw image into the designated value.

Once an AF operation with respect to the at least one raw image obtained using the image sensing module 310 from the processor 320 is requested, the AF controller 340 may automatically detect an AF region that is in focus on an object (e.g., at least one object). According to an embodiment, the AF operation may include touch AF based on a touch or continuous AF in which a moving object is continuously in focus. According to an embodiment, the AF scheme may include a contrast AF scheme, a DFD AF scheme, or a combination thereof.

The codec 350 may include a video codec. The codec 350 may encode video data obtained from the image sensing module 310 and transmit the encoded video data to an external electronic device (e.g., the electronic device 102, the electronic device 104, or the server 108), or may decode video data received from the external electronic device (e.g., the electronic device 102, the electronic device 104, or the server 108).

The display device 360 may include the entire display device 160 illustrated in FIG. 1 or a part thereof. The display device 360 may display at least one second raw image obtained from the image sensing module 310. The display device 360 may apply a specific image effect to at least a part of the at least one second raw image and display the image effect-applied image. The display device 360 may display the video data encoded or decoded through the codec 350 on the display device 360.

The communication circuit 370 may include the entire communication module 190 illustrated in FIG. 1 or a part thereof. The communication module 370 may transmit at least one raw image or small raw image obtained from the image sensing module 310 to the external electronic device (e.g., the electronic device 102 or 104 or the server 108) or receive the same from the external electronic device (e.g., the electronic device 102 or 104 or the server 108).

Figure 3B:
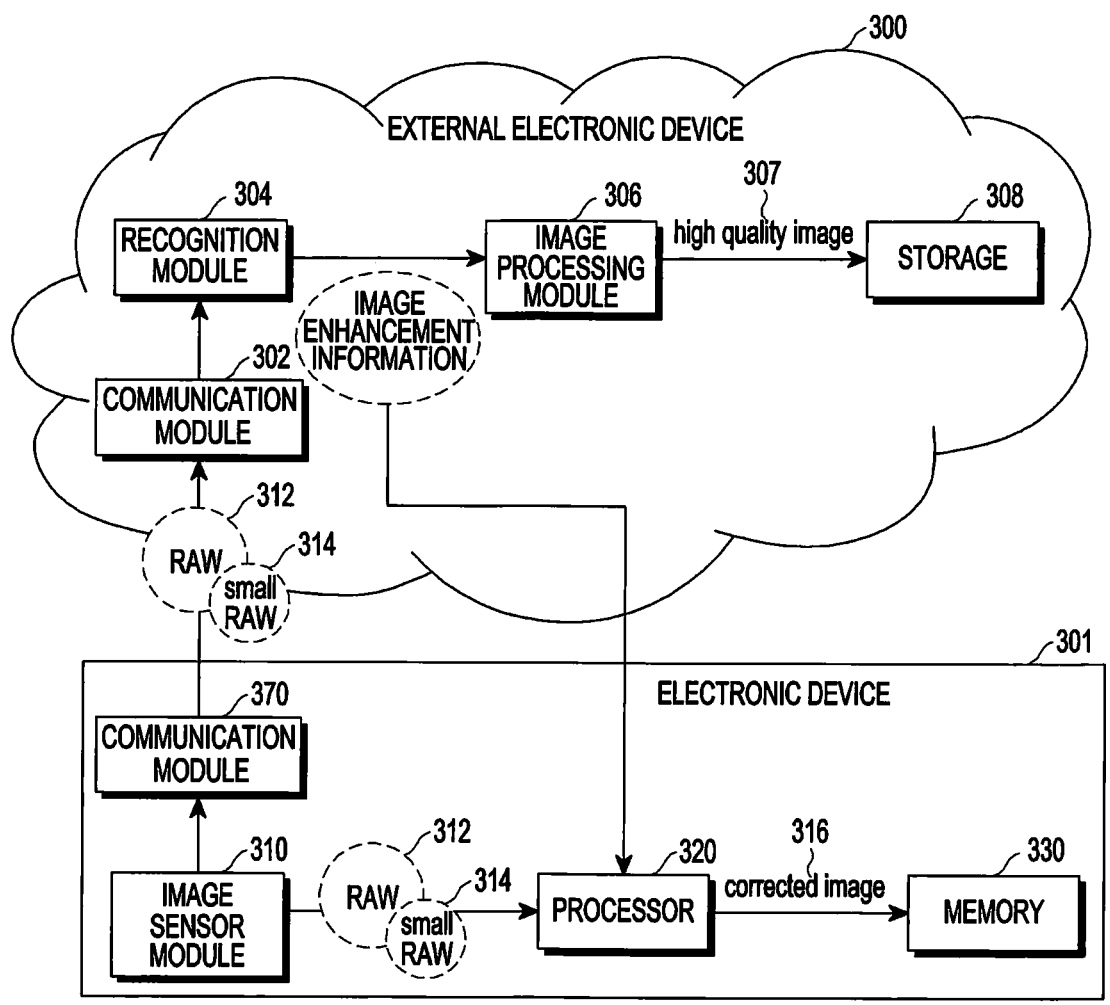
FIG. 3B is a conceptual diagram for describing operations of an electronic device and an external electronic device, according to various embodiments.

FIG. 3B is a conceptual diagram for describing operations of an electronic device and an external electronic device 300, according to various embodiments. In FIG. 3B, the electronic device may include the entire electronic device 301 shown in FIG. 3A or a part thereof, and the external electronic device 300 may include the entire external electronic device (e.g., the electronic device 102 or 104 or the server 108) shown in FIG. 1 or a part thereof.

The electronic device 301 may include at least one of the image sensing module 310, the processor 320 (e.g., the ISP 323a), the memory 330, or the communication module 370. The electronic device 301 may transmit and receive data (e.g., a raw image 312 or a small raw image 314) with the external electronic device 300 through the communication module 370.

The external electronic device 300 may include at least one of a communication module 302, a recognition module 304, an image processing module 306, or a storage 308. The communication module 320 may transmit and receive data (e.g., a raw image 312 or a small raw image 314) with the electronic device 301. The recognition module 304 may be a logic module and may be implemented as a processor of the external electronic device 300. The image processing module 306 may also be implemented as a processor of the external electronic device 300, and for example, a processor of the external electronic device 300 may perform both recognition and image processing.

The image sensing module 310 (e.g., the control circuit 319) may obtain an image of at least one external object, and generate the raw image 312 corresponding thereto. The image sensing module 310 may deliver the raw image 312 to the processor 320 (e.g., the ISP 323a). According to various embodiments of the present disclosure, the image sensing module 310 may generate the small raw image 314 and transmit the same to the processor 320 (e.g., the ISP 323a) or to the external electronic device 300 through the communication module 370.

According to various embodiments, the small raw image 314 may mean a raw image having a smaller size than a data size of the raw image 312, and may not be interpreted as being limited to an image generated by a particular format or method. For example, the small raw image 314 may be generated by reducing a volume of the raw image 312 and may be referred to as a lightweight image. The electronic device 301 may generate the small raw image 314 from the raw image 312 by using various down-scaling or down-sampling schemes. The electronic device 301 may generate the small raw image 314 having a smaller size than a data size of the raw image 312 by performing at least one of adjustment of a resolution of the raw image 312, selection of at least a part of a plurality of frequency bands, or selection of at least one of a plurality of bit plane levels. The electronic device 301 may generate the small raw image 314 by extracting a low-frequency band from the raw image 312. The electronic device 301 may generate the small raw image 314 by selecting some bit plane levels from among a plurality of bit plane levels of the raw image 312. The small raw image 314 may include at least a part of information of the raw image 312 and has a smaller volume than the raw image 312. When the small raw image 314 is transmitted to the external electronic device 300 instead of the raw image 312, a smaller volume of data is transmitted, such that the image may be transmitted faster to the external electronic device 300.

In another embodiment, the processor 320 of the electronic device 301 instead of the image sensing module 310 may generate the small raw image 314, and transmit the generated small raw image 314 to the external electronic device 300 through the communication module 370. The image sensing module 310 may compress the raw image 312 for processing with respect to at least a part of the raw image 312 or transmission to an external device (e.g., the processor 320 (e.g., the ISP 323a) or the external electronic device 300). The image sensing module 310 may transmit the compressed raw image 312 to the processor 320 (e.g., the ISP 323a) or the external electronic device 300 (e.g., the image processing module 306). In another embodiment, the processor 320 (e.g., the ISP 323a) may transmit a compressed raw image or small raw image received from the image sensing module 310 to the external electronic device 300. The image sensing module 310 may compress the raw image 312 for partial processing with respect to the same and temporarily store the compressed raw image 312 in an internal memory (e.g., the memory 250) of the image sensing module 310. The recognition module 304 of the external electronic device 300 may obtain the small raw image 314 through the communication module 302, and segment at least one image region from the small raw image 314. The recognition module 304 may recognize each of at least one image region divided as a result of segmentation. Image enhancement information 305 may be generated, which includes information related to a plurality of image regions generated from the recognition module 304, e.g., coordinate information of an image region or a recognition result. The image enhancement information 305 may be transmitted to the electronic device 301. The processor 320 (e.g., the ISP 323a) may enhance the raw image 312 by using the image correction information 305, and thus a corrected image 316 may be generated. The corrected image 316 may have, for example, a format of YUV. The corrected image 316 may be stored in the memory 330. The corrected image 316 may be compressed according to, for example, the Joint Photographic Experts Group (JPEG) scheme, and the compressed image may be stored in the memory 330.

In various embodiments of the present disclosure, the raw image 312 provided from the image sensing module 310 may be transmitted to the external electronic device 300 separately from the small raw image 314. The raw image 312 has a larger volume than the small raw image 314, such that the small raw image 314 is first transmitted to the external electronic device 300 and then the raw image 312 is transmitted to the external electronic device 300. For example, when the processor 320 (e.g., the ISP 323a) performs enhancement with respect to the raw image 312, the raw image 312 may be transmitted to the external electronic device 300. The raw image 312 may be uploaded to the external electronic device 300 in the original form generated by the image sensing module 310 or may be uploaded after being pre-processed by lens distortion compensation or noise cancellation. The pre-processing may be performed in the external electronic device 300. The external electronic device 300 may perform pre-processing for demosaic processing or image format change, or pre-processing for improving an image recognition rate. The image processing module 306 of the external electronic device 300 may enhance the received raw image 312. The external electronic device 300 may enhance the raw image 312 by using the existing generated image enhancement information 305 or by using scaled image enhancement information. The raw image 312 may have a higher resolution than the small raw image 314, such that the image processing module 306 of the external electronic device 300 may obtain detailed scaled image enhancement information from the high-resolution image. The image processing module 306 may generate the scaled image enhancement information by using the existing generated image enhancement information and the raw image 312. The image processing module 306 may obtain a high-quality image 307 by enhancing the raw image 312 using the scaled image enhancement information. The high-quality image 307 may be stored in the storage 308 of the external electronic device 300, and may be downloaded in the electronic device 301.

FIGS. 4A through 4D are views for describing a method for obtaining various additional information by using a hidden frame or an output frame, according to various embodiments.

Referring to FIGS. 4A through 4D, an electronic device (e.g., the electronic device 301) according to various embodiments may obtain at least one raw image through an image sensing module (e.g., the image sensing module 310), and the obtained at least one raw image may be used as a hidden frame or an output frame according to an application to be executed. The electronic device 301 may obtain various additional information by using various combinations of at least one hidden frame or at least one output frame.

According to an embodiment, the electronic device 301 may obtain various additional information by corresponding a hidden frame and an output frame based on a one-to-one, one-to-multiple, multiple-to-one, or multiple-to-multiple relationship. The electronic device 301 may obtain at least one new raw image based on the obtained additional information.

Figure 4A:
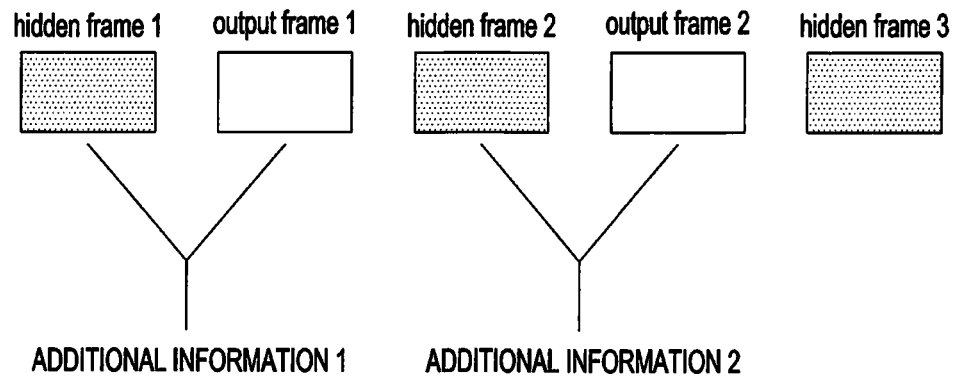
FIGS. 4A through 4D are views for describing a method for obtaining various additional information by using a hidden frame or an output frame, according to various embodiments.

Referring to FIG. 4A, the electronic device 301 (e.g., the control circuit 319) may obtain additional information by corresponding a hidden frame and an output frame based on a one-to-one relationship. For example, the electronic device 301 (e.g., the control circuit 319) may obtain additional information 1 by using a hidden frame 1 and an output frame 1, and additional information 2 by using a hidden frame 2 and an output frame 2. The electronic device 301 (e.g., the control circuit 319) may obtain at least one new raw image based on at least a part of the additional information 1 or the additional information 2.

Figure 4B:
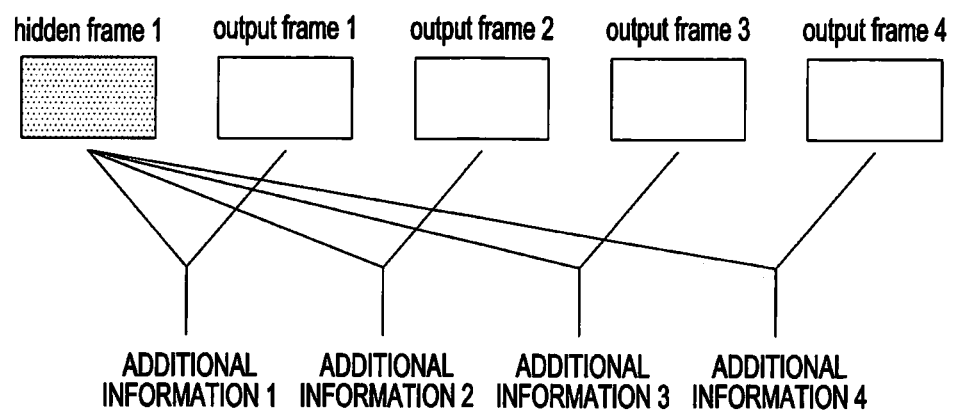

Referring to FIG. 4B, the electronic device 301 (e.g., the control circuit 319) may obtain additional information by corresponding a hidden frame and an output frame based on a one-to-multiple relationship. For example, the electronic device 301 (e.g., the control circuit 319) may obtain the additional information 1 by using the hidden frame 1 and the output frame 1, the additional information 2 by using the hidden frame 2 and the output frame 2, additional information 3 by using a hidden frame 3 and an output frame 3, and additional information 4 by using a hidden frame 4 and an output frame 4. The electronic device 301 (e.g., the control circuit 319) may obtain at least one new raw image based on at least a part of the additional information 1, the additional information 2, the additional information 3, or the additional information 4.

Figure 4C:
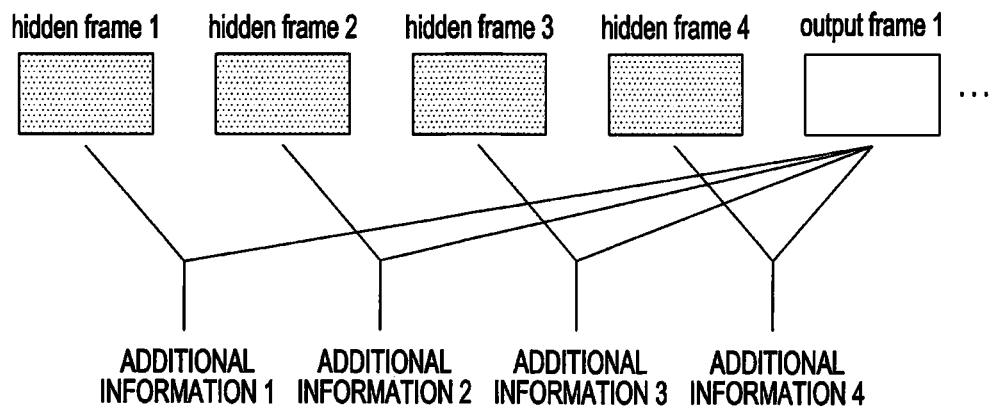

Referring to FIG. 4C, the electronic device 301 (e.g., the control circuit 319) may obtain additional information by corresponding a hidden frame and an output frame based on a one-to-multiple relationship. For example, the electronic device 301 (e.g., the control circuit 319) may obtain the additional information 1 by using the hidden frame 1 and the output frame 1, the additional information 2 by using the hidden frame 2 and the output frame 1, additional information 3 by using the hidden frame 3 and the output frame 1, and the additional information 4 by using the hidden frame 4 and the output frame 1. The electronic device 301 (e.g., the control circuit 319) may obtain at least one new raw image based on at least a part of the additional information 1, the additional information 2, the additional information 3, or the additional information 4.

Figure 4D:
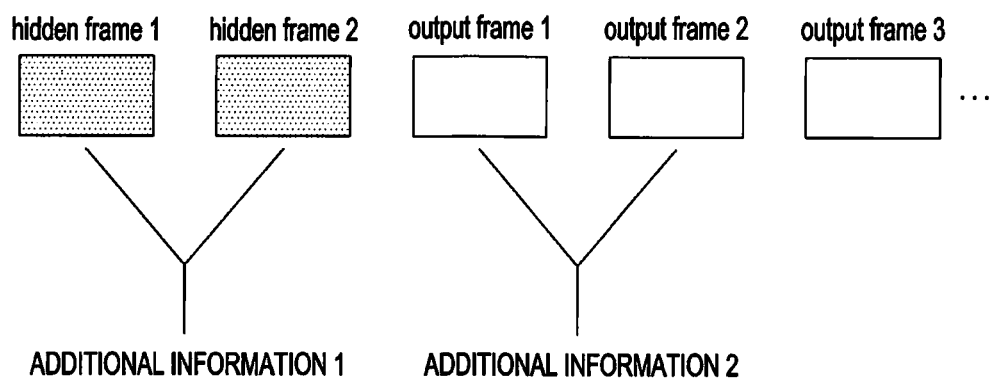

Referring to FIG. 4D, the electronic device 301 (e.g., the control circuit 319) may obtain the additional information by variously combining hidden frames or variously combining output frames. For example, the electronic device 301 (e.g., the control circuit 319) may obtain the additional information 1 by using the hidden frame 1 and the hidden frame 2, and the additional information 2 by using the output frame 1 and the output frame 2. The electronic device 301 (e.g., the control circuit 319) may obtain at least one new raw image (e.g., the output frame 3) based on at least a part of the additional information 1 or the additional information 2.

FIG. 5A through 5D are views for describing an image compression method of an electronic device according to various embodiments.

Figure 5A:
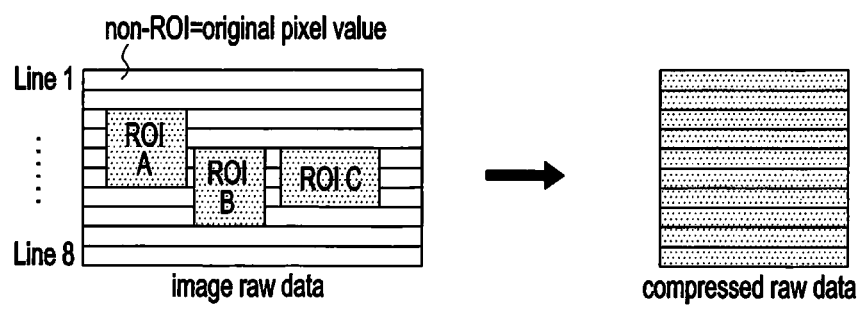
FIGS. 5A through 5D are views for describing an image compression method of an electronic device according to various embodiments.

Shown in FIG. 5A is a compression method for a normal raw image (e.g., a raw image in which data (e.g., second data) for a second region (e.g., a non-ROI) except for a first region (e.g., an ROI) is not converted into a designated value), in which the control circuit 319 may compress the normal raw image according to a designated frame compression rate by using the compressor 315. In this case, the normal raw image may be uniformly compressed at the designated frame compression rate.

Figure 5B:
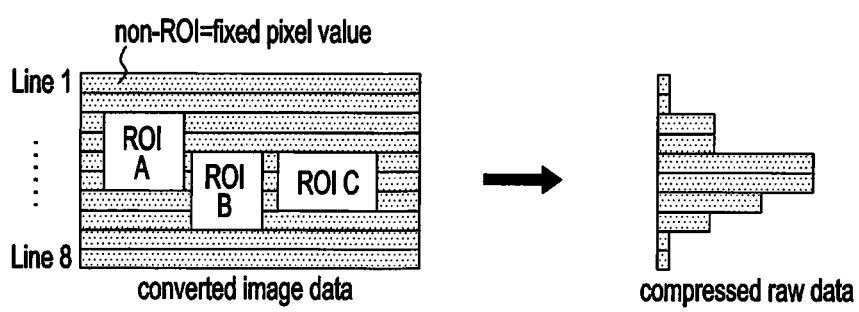

Shown in FIG. 5B is a compression method for a raw image (e.g., a raw image in which data (e.g., the second data) for the second region (e.g., the non-ROI) except for the first region (e.g., the ROI) is converted into a designated value), in which the control circuit 319 may convert a raw image to be converted among at least one raw image by changing data (e.g., the second data) corresponding to the second region (e.g., the non-ROI) except for first regions (e.g., an ROI A, an ROI B, and an ROI C) in the raw image to be converted. The control circuit 319 may compress the converted raw image according to a designated frame compression rate by using the compressor 315. In this case, the first regions (e.g., the ROI A, the ROI B, and the ROI C) or the second region (e.g., the non-ROI) except for the first region may differ with a line of the converted raw image, such that the amount of the first data corresponding to the first region or the amount of the second data corresponding to the second region may vary with a line, and thus the converted raw image may be compressed differently with each line. When the converted raw image is compressed at the designated frame compression rate, lines (e.g., Line 5 and Line 6) including a large portion of the first regions (e.g., the ROI A, the ROI B, and the ROI C) among at least one line in the converted raw image may exceed a target compression rate. In this case, as shown in FIG. 5C, compression rates of the lines exceeding the target compression rate may be adjusted.

Figure 5C:
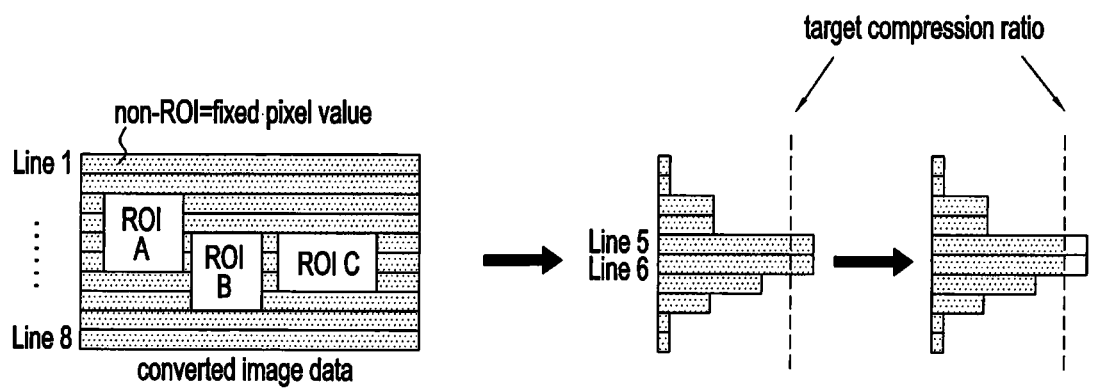

Shown in FIG. 5C is a compression method for a raw image (e.g., a raw image in which data (e.g., the second data) for the second region (e.g., the non-ROI) except for the first region (e.g., the ROI) is converted into a designated value), in which the control circuit 319 may convert a raw image to be converted among at least one raw image by changing data (e.g., the second data) corresponding to the second region (e.g., the non-ROI) except for the first regions (e.g., the ROI A, the ROI B, and the ROI C) in the raw image to be converted. The control circuit 319 may compress the converted raw image by using the compressor 315. In this case, the control circuit 319 may set a line compression rate for each line of the converted at least one raw image based on at least one of the designated frame compression rate, the speed of the I/F 317 of the image sensing module 310, or the speed of an I/F 327 of the processor 320. The control circuit 319 may compress the converted raw image for each line according to the set line compression rate. For example, the control circuit 319 may control a compression rate for each line of the converted raw image, thus adjusting a compression rate of each line based on an overall frame compression rate by lowering a compression rate for a line having much data and increasing a compression rate for a line having less data to avoid a line (e.g., line 5 and line 6) exceeding a target compression rate.

Figure 5D:
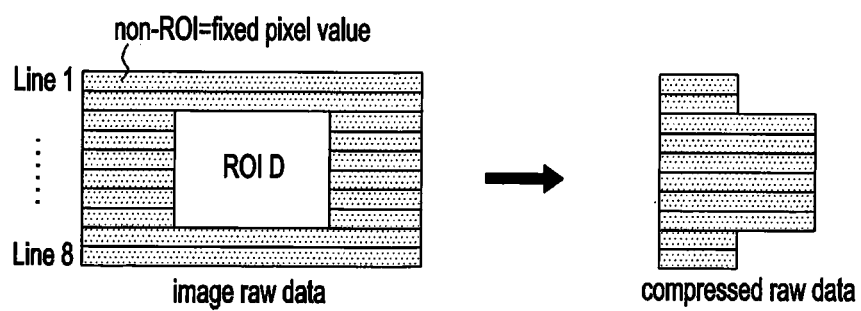

Shown in FIG. 5D is a compression method for a raw image (e.g., a raw image in which data (e.g., the second data) for the second region (e.g., the non-ROI) except for the first region (e.g., an ROI D) is converted into a designated value), in which the control circuit 319 may convert a raw image to be converted among at least one raw image by changing data (e.g., the second data) corresponding to the second region (e.g., the non-ROI) except for the first regions (e.g., the ROI D) in the raw image to be converted. A compression method shown in FIG. 5D is the same as that shown in FIG. 5B except that the first region (e.g., the ROI D) is a region corresponding to digital zoom information (e.g., center location information and magnification information), and thus will not be described in detail.

According to an embodiment, the control circuit 319 may obtain, as the information associated with the first region (e.g., the ROI D), a region of a size corresponding to the magnification information with respect to the center location information to be enlarged by digital zooming in the raw image to be converted. For example, when the center location information indicates the center of the raw image to be converted and the magnification information indicates 200%, the control circuit 319 may obtain a region corresponding to ½ of each of a width and a height of the raw image to be converted with respect to the center of the at least to be converted in the raw image to be converted. The control circuit 319 may convert the raw image to be converted, by changing data (e.g., the second data) corresponding to the second region (e.g., the non-ROI) except for the first region (e.g., the ROI D) into a designated value.

According to various embodiments, an electronic device (e.g., the electronic device 301) may include a processor (e.g., the processor 320) and an image sensing module (e.g., the image sensing module 310), and the image sensing module 310 may include an image sensor (e.g., the image sensor 313) and a control circuit (e.g., the control circuit 319) electrically connected to the image sensor 313 and with the processor 320 through an interface. The control circuit 319 may obtain at least one raw image by using the image sensor 313. The control circuit 319 may designate the at least one raw image as first data corresponding to the first region and second data corresponding to the second region except for the first region, based on the information associated with the first region in the at least one raw image. The control circuit 319 may convert the at least one raw image by changing at least a part of the second data into a designated value. The control circuit 319 may transmit the converted at least one raw image to the processor 320.

According to various embodiments, the at least one raw image may include at least one object. The control circuit 319 or the processor 320 may be configured to obtain a region corresponding to the at least one object as the first region.

According to various embodiments, the at least one raw image may include the first raw image or the second raw image, and the processor 320 may be configured to output the second raw image through the display device 360 without outputting the first raw image through a display device (e.g., the display device 360).

According to various embodiments, image attributes of each of the at least one raw image may include at least one of a lens position, a resolution, an exposure time, an exposure sensitivity, or a frame rate, and each of the at least one raw image may have at least a different one of the image attributes.

According to various embodiments, the control circuit 319 may be configured to obtain as the first region, at least one of a region focused by an AF operation performed using the image sensing module 310, an object region recognized by an object recognition operation in the at least one raw image, a region corresponding to information about a designated region received from the processor 320 in the at least one raw image, a region corresponding to a designated region size in the at least one raw image based on information about a designated location received from the processor 320 when the region size for the first region is designated, or a region corresponding to digital zoom information (e.g., center location information and magnification information) received from the processor in the at least one raw image.

According to various embodiments, the control circuit 319 may determine the designated value for the second data, based on a default value stored in a memory (e.g., the memory 330 or the memory 250) electrically connected with the control circuit 319 or at least a part of the first data.

According to various embodiments, the at least one raw image is a frame including a plurality of lines, and the control circuit 319 may determine the designated value for the second data based on at least a part of the first data for each line of the at least one raw image.

According to various embodiments, the control circuit 319 may determine the designated value for the second data included in the first line as a first value based on at least a part of the first data corresponding to the first line among the plurality of lines of the at least one raw image, and change the second data included in the first line into the first value. The control circuit 319 may determine the designated value for the second data included in the second line as a second value based on at least a part of the first data corresponding to the second line among the plurality of lines of the at least one raw image, and change the second data included in the second line into the second value.

According to various embodiments, the control circuit 319 may set a frame compression rate, compress the converted at least one raw image based on the set frame compression rate, and transmit the compressed at least one raw image to the processor 320.

According to various embodiments, the at least one raw image is a frame including a plurality of lines, and the control circuit 319 may set a frame compression rate, and may set a line compression rate for each line of the converted at least one raw image based on at least one of the set frame compression rate, the interface speed of an interface (e.g., the I/F 317) of the image sensing module 310, or the interface speed of an interface (e.g., the I/F 327) of the processor 320. The control circuit 319 may compress the converted at least one raw image for each line based on the set line compression rate and transmit the at least one raw image compressed for each line to the processor 320 line-by-line.

According to various embodiments, an electronic device (e.g., the electronic device 301) may include a processor (e.g., the processor 320) and an image sensing module (e.g., the image sensing module 310), and the image sensing module 310 may include an image sensor (e.g., the image sensor 313) and a control circuit (e.g., the control circuit 319) electrically connected to the image sensor 313 and with the processor 320 through an interface. The processor 320 may receive the compressed at least one raw image from the image sensing module 310, and decompress the received at last one raw image. The processor 320 may perform image processing with respect to the decompressed at least one raw image and display the image-processed at least one raw image on a display device (e.g., the display device 360) of the electronic device 301.

According to various embodiments, the processor 320 may be configured to obtain a first region in the decompressed at least one raw image, to perform image processing with respect to the obtained first region, to generate at least one display image based on the image-processed first region, and to display the generated display image on the display device.

According to various embodiments, the processor 320 may be configured to generate the display image by enlarging the first region according to a magnification of digital zooming.

According to various embodiments, the processor 320 may be configured to transmit information associated with the first region in the at least one raw image to be obtained in the image sensing module 310 to the image sensing module 310.

According to various embodiments, the information associated with the first region may include at least a part of information about an object recognized by object recognition in the at least one rawl image, information about the designated region, information about the designated location, or digital zoom information (e.g., center location information and magnification information).

According to various embodiments, the processor 320 may be configured to obtain the first region in the decompressed at least one raw image, to estimate the first region in the at least one raw image to be obtained in the image sensing module 310 based on the obtained first region, and to transmit information about the estimated first region to the image sensing module 310.

Figure 6:
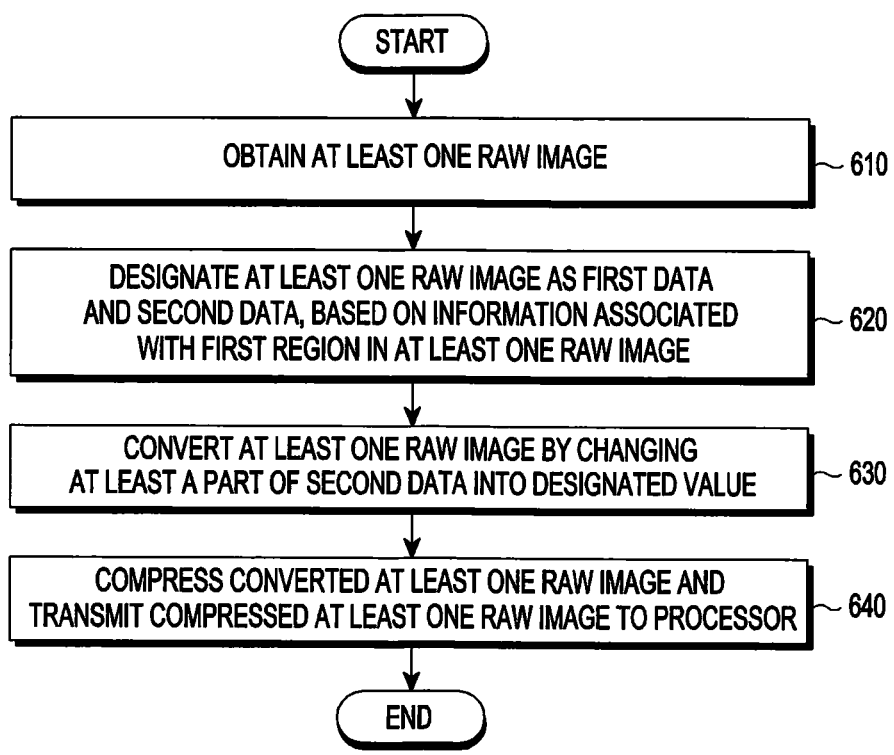
FIG. 6 is a flowchart illustrating an image compression method of an electronic device, according to various embodiments.

FIG. 6 is a flowchart illustrating an image compression method of an electronic device, according to various embodiments. The method may be performed by at least one of the electronic device (e.g., the electronic device 301) or the image sensing module 310 (e.g., the control circuit 319) of the electronic device.

In operation 610, for example, the control circuit may obtain at least one raw image by using an image sensor (e.g., the image sensor 313) of the electronic device.

According to an embodiment, the at least one raw image may include a first raw image or a second raw image. The first raw image may include a hidden frame, and the at least one second raw image may include an output frame.

In operation 620, the control circuit may designate the at least one raw image as first data corresponding to the first region and second data corresponding to the second region except for the first region, based on the information associated with the first region in the at least one raw image.

According to an embodiment, the first region may be an ROI, and the second region except for the first region may be a non-ROI.

According to various embodiments, the control circuit may be configured to obtain as the first region, at least one of a region focused by an AF operation performed using the image sensing module (e.g., the image sensing module 310), an object region recognized by an object recognition operation in the at least one raw image, a region corresponding to information about a designated region received from the processor of the electronic device (e.g., the processor 320) in the at least one raw image, a region corresponding to designated location information received from the processor in the at least one raw image when a size for the first region is designated, or a region corresponding to digital zoom information (e.g., center location information and magnification information) received from the processor in the at least one raw image.

In operation 630, the control circuit may convert the at least one raw image by changing at least a part of the second data in the at least one raw image into the designated value.

According to an embodiment, the first data and the second data may include a pixel value (e.g., a luminance) corresponding to each pixel in the at least one raw image.

According to an embodiment, the designated value for the second data may be determined. According to an embodiment, the control circuit may determine a default value stored in the memory (e.g., the memory 330 or the memory 250) electrically connected with the control circuit as the designated value for the second data.

According to an embodiment, the control circuit 319 may determine the default value for the second data, based on at least a part of the first data. According to an embodiment, the control circuit may determine the designated value for the second data included in each line based on at least a part of the first data included in each line at least one line-by-line in the at least one raw image.

According to an embodiment, the control circuit may convert the at least one raw image by changing the second data in the at least one raw image into the designated value.

According to an embodiment, the control circuit may convert the at least one raw image by changing the second data corresponding to each line into a value determined for each line at least one line-by-line in the at least one raw image.

According to an embodiment, the control circuit may change the second data corresponding to the first line among the plurality of lines of the at least one raw image into the first value and change the second data corresponding to the second line into the second value.

In operation 640, the control circuit may compress the converted at least one raw image and transmit the compressed image to the processor 320.

According to an embodiment, the control circuit may transmit the compressed at least one raw image to the processor 320 frame-by-frame.

According to an embodiment, the control circuit may transmit the compressed at least one raw image to the processor 320 line-by-line of each frame.

Figure 7:
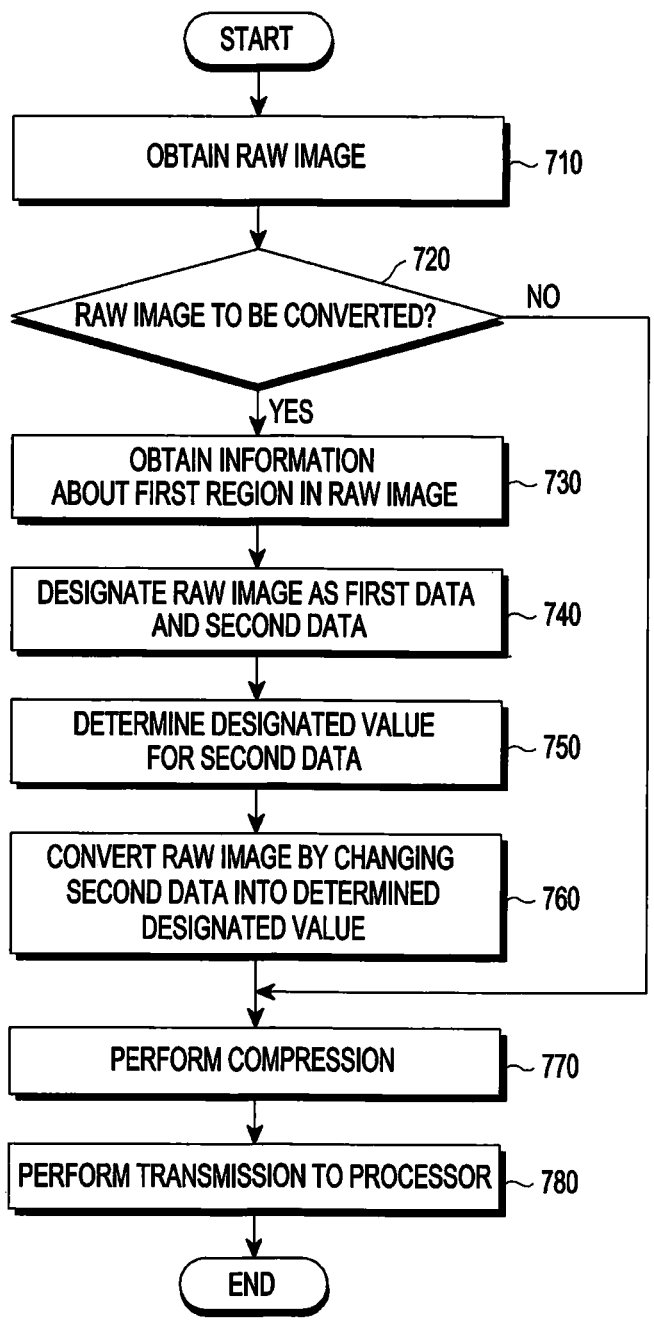
FIG. 7 is a flowchart illustrating an image compression method of an electronic device, according to various embodiments.

FIG. 7 is a flowchart illustrating an image compression method of an electronic device, according to various embodiments. The method may be performed by at least one of the electronic device (e.g., the electronic device 301) or the image sensing module 310 (e.g., the control circuit 319) of the electronic device.

In operation 710, for example, the control circuit may obtain at least one raw image by using an image sensor (e.g., the image sensor 313) of the electronic device.

According to an embodiment, the at least one raw image may include a first raw image or a second raw image. The first raw image may include a hidden frame, and the at least one second raw image may include an output frame.

In operation 720, the control circuit may determine whether the at least one raw image obtained through the image sensor is a raw image to be converted. For example, the control circuit may determine whether the obtained raw image is a raw image in which data (e.g., the second data) for the second region (e.g., the non-ROI) except for the first region (e.g., the ROI) in the at least one raw image is to be converted into a designated value. When the obtained raw image is the raw image to be converted in operation 720, the control circuit may perform operation 730; unless the obtained raw image is the raw image to be converted in operation 720, the control circuit may determine that the obtained raw image is a normal raw image and perform operation 770.

In operation 730, when the obtained raw image is the raw image to be converted, the control circuit may obtain information about the first region in the obtained at least one raw image.

According to an embodiment, the first region may be an ROI, and the second region except for the first region may be a non-ROI.

According to various embodiments, the control circuit may be configured to obtain as the first region, at least one of a region focused by an AF operation performed using the image sensing module (e.g., the image sensing module 310), an object region recognized by an object recognition operation in the at least one raw image, a region corresponding to information about a designated region received from the processor in the at least one raw image, a region corresponding to designated location information received from the processor in the at least one raw image when a size for the first region is designated, or a region corresponding to digital zoom information (e.g., center location information and magnification information) received from the processor in the at least one raw image.

In operation 740, the control circuit may designate the at least one raw image (e.g., the raw image to be converted) as first data corresponding to the first region and second data corresponding to the second region except for the first region, based on the information associated with the first region in the at least one raw image (e.g., the raw image to be converted).

According to an embodiment, the first data and the second data may include a pixel value (e.g., a luminance) corresponding to each pixel in the at least one raw image.

In operation 750, the control circuit may determine a designated value for the second data in the at least one raw image (e.g., the raw image to be converted).

According to an embodiment, the designated value for the second data may be determined. According to an embodiment, the control circuit may determine a default value stored in the memory (e.g., the memory 330 or the memory 250) electrically connected with the control circuit as the designated value for the second data.

According to an embodiment, the control circuit may determine the designated value for the second data, based on at least a part of the first data. According to an embodiment, the control circuit may determine the designated value for the second data included in each line based on at least a part of the first data included in each line at least one line-by-line in the at least one raw image (e.g., the raw image to be converted).

In operation 760, the control circuit may convert the first raw image by changing at least a part of the second data in the at least one raw image (e.g., the raw image to be converted) into the designated value.

According to an embodiment, the control circuit may convert the first raw image by changing the second data in the at least one raw image into the designated value.

According to an embodiment, the control circuit may convert the at least one raw image (e.g., the raw image to be converted) by changing the second data corresponding to each line into a value determined for each line at least one line-by-line in the at least one raw image (e.g., the raw image to be converted). For example, the control circuit may convert the at least one raw image (e.g., the raw image to be converted) by changing the second data corresponding to the first line among the plurality of lines of the at least one raw image into the first value and changing the second data corresponding to the second line into the second value. The control circuit may generate the converted at least one raw image including the first data and the second data that has been changed into the first value and the second value.

In operation 770, the control circuit may compress the converted at least one raw image or the normal at least one raw image.

According to an embodiment, the control circuit may compress the converted at least one raw image by using the compressor (e.g., the compressor 315). In this case, the control circuit may set a line compression rate for each line of the converted at least one raw image, based on at least one of the designated frame compression rate, the speed of the interface (e.g., the I/F 317) of the image sensing module, or the speed of the interface (e.g., the I/F 327) of the processor. The control circuit may compress the converted raw image for each line according to the set line compression rate. For example, the control circuit may control a compression rate for each line, thus adjusting a compression rate of each line based on an overall frame compression rate by lowering a compression rate for a line having much data and increasing a compression rate for a line having less data to avoid a line (e.g., line 5 and line 6) exceeding a target compression rate.

According to an embodiment, the control circuit may compress the normal raw image based on the designated frame compression rate.

In operation 780, the control circuit may transmit the compressed at least one raw image to the processor 320.

According to an embodiment, the control circuit may transmit the compressed at least one raw image to the processor 320 frame-by-frame.

According to an embodiment, the control circuit may transmit the compressed at least one raw image to the processor 320 line-by-line of each frame.

Figure 8:
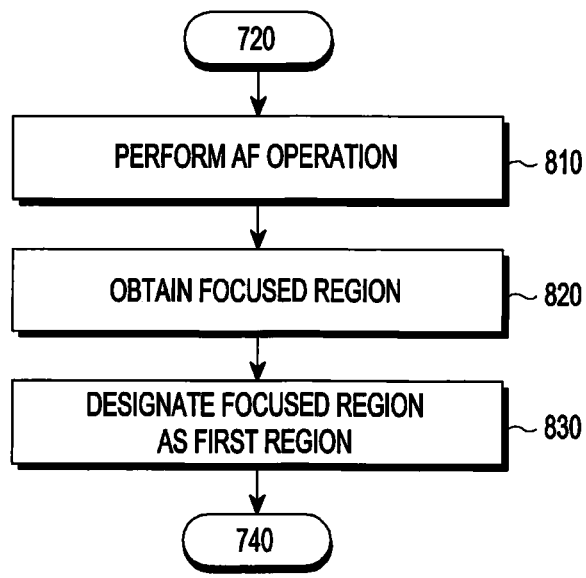
FIG. 8 is a flowchart illustrating an image compression method of an electronic device, according to various embodiments.

FIG. 8 is a flowchart illustrating an image compression method of an electronic device, according to various embodiments. FIG. 8 is a detailed flowchart illustrating a method of obtaining information about a first region in at least one raw image in operation 730 shown in FIG. 7, in which the method may be performed by at least one of an electronic device (e.g., the electronic device 301) or a processor (e.g., the control circuit 319 or the processor 320) of the electronic device.

In operation 810, for example, the control circuit or the processor may perform an AF operation with respect to at least one raw image obtained using an image sensing module (e.g., the image sensing module 310), by using the image sensing module.

According to an embodiment, the AF operation may include a contrast AF operation or a DFD AF operation.

In operation 820, for example, the control circuit or the processor may obtain a region focused by the AF operation performed in the at least one raw image.

According to an embodiment, the focused region may be a region corresponding to at least one object in the at least one raw image.

In operation 830, the control circuit or the processor may designate the focused region as the first region in the at least one raw image.

According to an embodiment, the control circuit or the processor may obtain information about the focused region as information associated with the first region.

Figure 9:
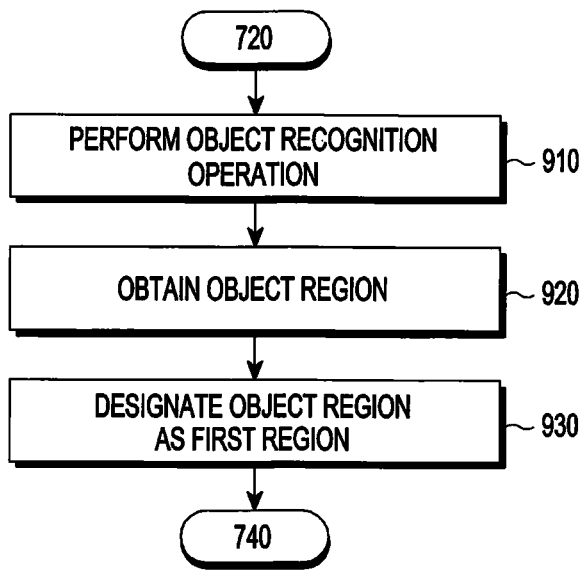
FIG. 9 is a flowchart illustrating an image compression method of an electronic device, according to various embodiments.

FIG. 9 is a flowchart illustrating an image compression method of an electronic device, according to various embodiments. FIG. 9 is a detailed flowchart illustrating a method of obtaining information about a first region in at least one raw image in operation 730 shown in FIG. 7, in which the method may be performed by at least one of an electronic device (e.g., the electronic device 301) or a processor (e.g., the control circuit 319 or the processor 320) of the electronic device.

In operation 910, for example, the control circuit or the processor may perform at least one object recognition operation with respect to at least one raw image obtained using an image sensing module (e.g., the image sensing module 310), by using the image sensing module.

According to an embodiment, the object recognition operation may be performed using known various face or object recognition techniques. According to an embodiment, the at least one object may be a photographing target, a subject, and may include various objects such as a person, a building, an object, a background, etc.

In operation 920, for example, the control circuit or the processor may obtain a region corresponding to the recognized object region in the at least one object raw image.

According to an embodiment, the region corresponding to the object region may be at least one face region.

In operation 930, the control circuit or the processor may designate the obtained region as the first region in the at least one raw image.

According to an embodiment, the control circuit or the processor may obtain information about the obtained region (e.g., location information or region size information about the obtained region) as information associated with the first region.

Figure 10:
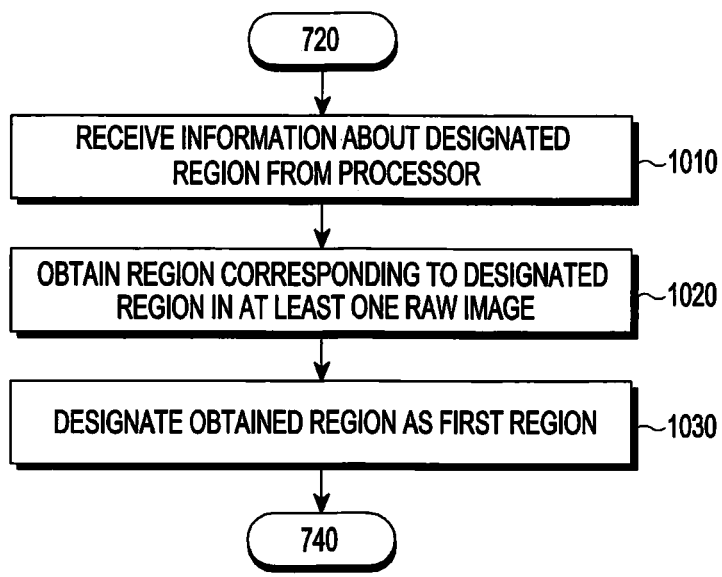
FIG. 10 is a flowchart illustrating an image compression method of an electronic device, according to various embodiments.

FIG. 10 is a flowchart illustrating an image compression method of an electronic device, according to various embodiments. FIG. 10 is a detailed flowchart illustrating a method of obtaining information about a first region in at least one raw image in operation 730 shown in FIG. 7, in which the method may be performed by at least one of an electronic device (e.g., the electronic device 301) or a processor (e.g., the control circuit 319 or the processor 320) of the electronic device.

In operation 1010, for example, the control circuit may receive information about a designated region from a processor (e.g., the processor 320).

According to an embodiment, the information about the designated region, received from the processor, may include at least one of location information (e.g., location coordinates on the display device 360) or size information of a designated region.

According to an embodiment, the designated region received from the processor may be designated based on information estimated for the first region in the processor.

In operation 1020, for example, the control circuit (or the processor) may obtain a region corresponding to the recognized object region in the at least one object raw image.

In operation 1030, the control circuit or the processor may designate the obtained region as the first region in the at least one raw image.

According to an embodiment, the control circuit (or the processor) may obtain information about the obtained region (e.g., location information or region size information about the obtained region) as information associated with the first region.

Figure 11:
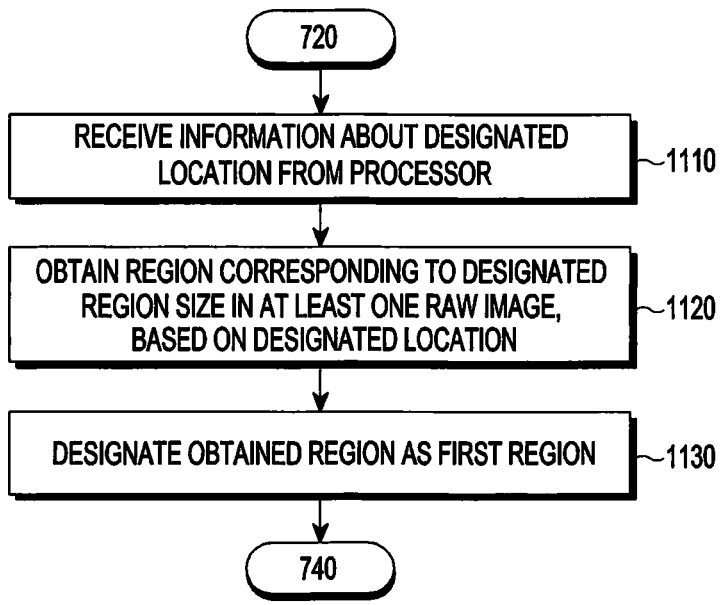
FIG. 11 is a flowchart illustrating an image compression method of an electronic device, according to various embodiments.

FIG. 11 is a flowchart illustrating an image compression method of an electronic device, according to various embodiments. FIG. 11 is a detailed flowchart illustrating a method of obtaining information about a first region in at least one raw image in operation 730 shown in FIG. 7, in which the method may be performed by at least one of an electronic device (e.g., the electronic device 301) or a processor (e.g., the control circuit 319 or the processor 320) of the electronic device.

In operation 1110, for example, when a size for the first region in the at least one raw image is designated, the control circuit may receive information about a designated location from a processor (e.g., the processor 320).

According to an embodiment, the information about the designated location, received from the processor, may be location coordinates on the display device 360 input (touched) by a user's input (e.g., touch). According to an embodiment, the information about the designated location, received from the processor, may be center coordinates or other designated coordinates on the preset display device 360 in the electronic device.

In operation 1120, for example, the control circuit (or the processor) may obtain a region corresponding to the designated size in the at least one object raw image, based on the received information about the location.

In operation 1130, for example, the control circuit (or the processor) may designate the obtained region as the first region in the at least one raw image.

According to an embodiment, the control circuit (or the processor) may obtain information about the obtained region (e.g., the received information about the location or size information of the designated region) as the information associated with the first region.

Figure 12:
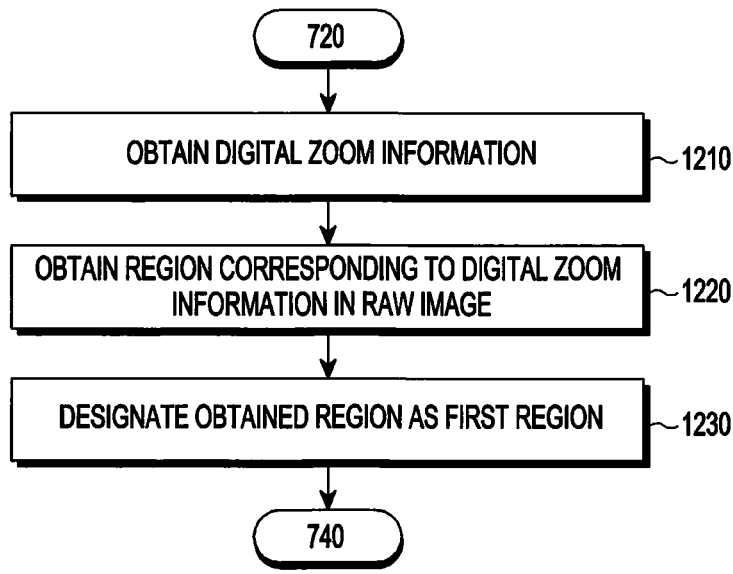
FIG. 12 is a flowchart illustrating an image compression method of an electronic device, according to various embodiments.

FIG. 12 is a flowchart illustrating an image compression method of an electronic device, according to various embodiments. FIG. 12 is a detailed flowchart illustrating a method of obtaining information about a first region in at least one raw image in operation 730 shown in FIG. 7, in which the method may be performed by at least one of an electronic device (e.g., the electronic device 301) or a processor (e.g., the control circuit 319 or the processor 320) of the electronic device.

In operation 1210, for example, the control circuit may receive digital zoom information from a processor (e.g., the processor 320).

According to an embodiment, the digital zoom information received from the processor may include center location information (e.g., location coordinates on the display device 360) or magnification information, to be enlarged by digital zooming.

According to an embodiment, the center location information or the magnification information to be enlarged by digital zooming may be input as a designated value by the user, may be previously set internally in the system (e.g., the center of a corresponding raw image), or may be input by a user's touch.

In operation 1220, for example, the control circuit (or the processor) may obtain a region corresponding to the digital zoom information (e.g., the center location information and the magnification information) in the at least one object raw image.

According to an embodiment, the control circuit (or the processor) may obtain, as the information associated with the first region, a region of a size corresponding to the magnification information with respect to the center location information to be enlarged by digital zooming in the at least one raw image. For example, when the center location information indicates the center of the at least one raw image and the magnification information indicates 200%, the control circuit or the processor may obtain a region corresponding to ½ of each of a width and a height of the at least one raw image with respect to the center of the at least one raw image in the at least one raw image, and obtain information about the obtained region as the information associated with the first region.

In operation 1230, for example, the control circuit (or the processor) may designate the obtained region as the first region in the at least one raw image.

According to an embodiment, the control circuit or the processor may obtain information about the obtained region (e.g., location information or region size information about the obtained region) as information associated with the first region.

Figure 13:
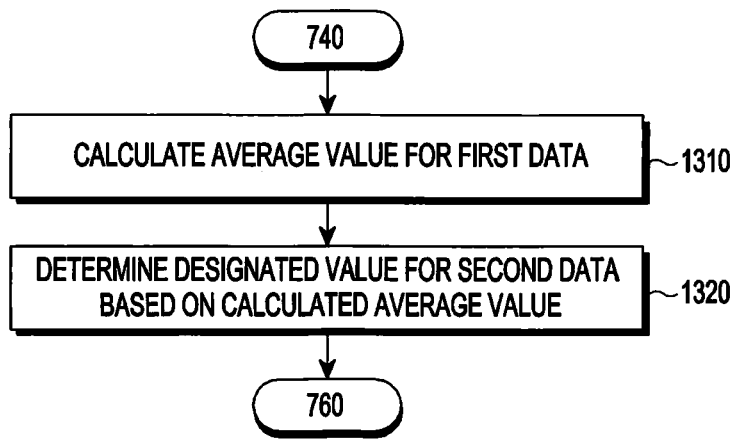
FIG. 13 is a flowchart illustrating an image compression method of an electronic device, according to various embodiments.

FIG. 13 is a flowchart illustrating an image compression method of an electronic device, according to various embodiments. FIG. 13 is a detailed flowchart illustrating a method of determining a designated value for second data that does not correspond to a first region in at least one raw image in operation 750 shown in FIG. 7, in which the method may be performed by at least one of an electronic device (e.g., the electronic device 301) or a processor (e.g., the control circuit 319) of the electronic device.

In operation 1310, for example, the control circuit may calculate an average value for first data corresponding to a first region in at least one raw image obtained using an image sensing module (e.g., the image sensing module 310).

According to an embodiment, the first data may include pixel values corresponding to the first region, and the control circuit may calculate an average value of the pixel values corresponding to the first region.

In operation 1320, the control circuit may determine the designated value for the second data that does not correspond to the first region in the at least one raw image, based on the calculated average value.

According to an embodiment, the second data may be pixel values that do not correspond to the first region, and the control circuit may determine one-pixel value in a pixel value range designated corresponding to the calculated average value as the designated value for the second data. When the calculated average value is 100 in a pixel value range of 0-255, and a designated pixel value range is designated as ±10, the designated value x for the second data may be determined as one in a range of 90<x<100 or 100<x<110.

Figure 14:
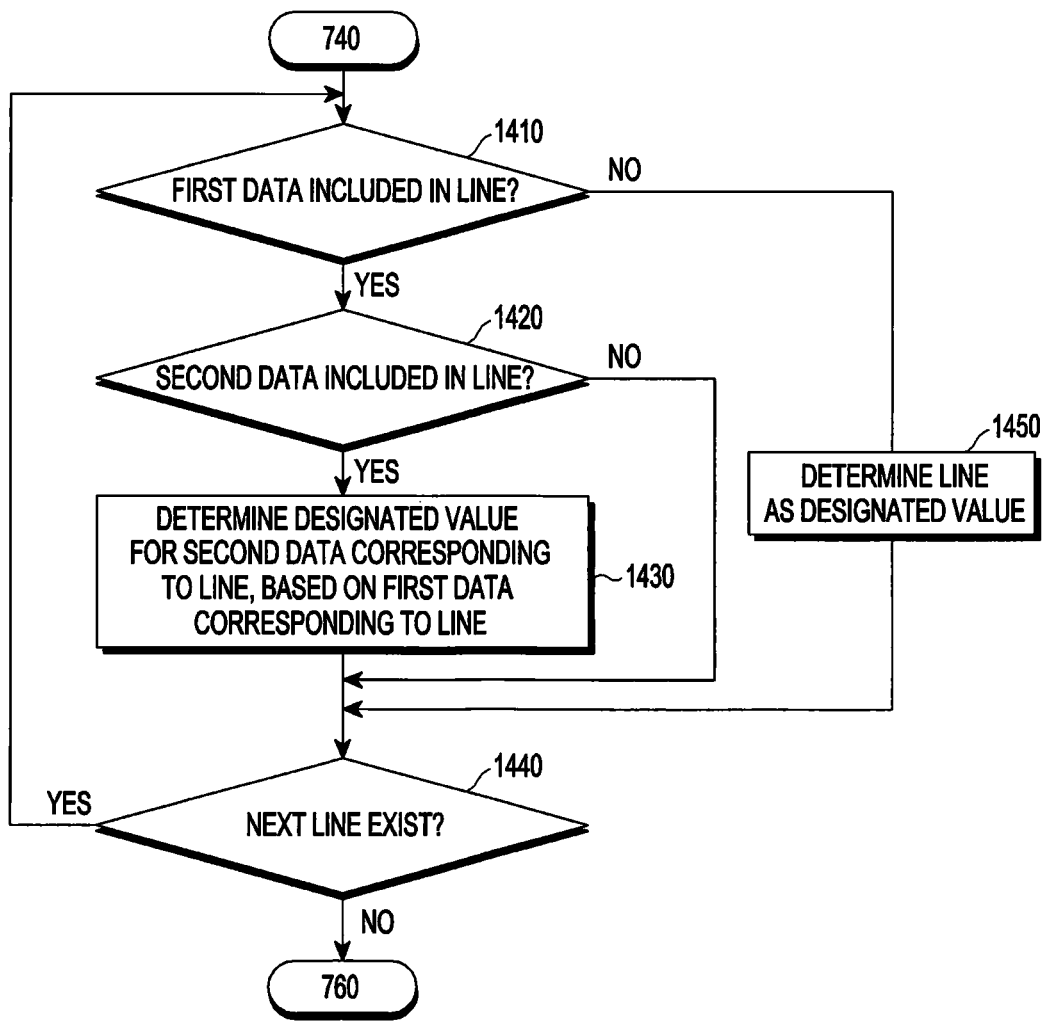
FIG. 14 is a flowchart illustrating an image compression method of an electronic device, according to various embodiments.

FIG. 14 is a flowchart illustrating an image compression method of an electronic device, according to various embodiments. FIG. 14 is a detailed flowchart illustrating a method of determining a designated value for second data that does not correspond to a first region in at least one raw image in operation 750 shown in FIG. 7, in which the method may be performed by at least one of an electronic device (e.g., the electronic device 301) or a processor (e.g., the control circuit 319) of the electronic device.

In operation 1410, for example, the control circuit may determine whether first data corresponding to a first region in at least one raw image obtained using an image sensing module (e.g., the image sensing module 310) is included in a corresponding line of a plurality of lines of the at least one raw image. When determining in operation 1410 that the first data corresponding to the first region in the at least one raw image is included in the plurality of lines of the at least one raw image, the control circuit may perform operation 1420; when determining that the first data corresponding to the first region in the at least one raw image is not included in the line among the plurality of lines of the at least one raw image, the control circuit may perform operation 1450.

In operation 1420, the control circuit may determine whether second data is included in the line among the plurality of lines of the at least one raw image. When determining in operation 1420 that second data is included in the line among the plurality of lines of the at least one raw image, the control circuit may perform operation 1430; when determining that the second data is not included in the line among the plurality of lines of the at least one raw image, the control circuit may perform operation 1440.

In operation 1430, the control circuit may determine a designated value for the second data corresponding to the line of the at least one raw image, based on the first data corresponding to the line.

According to an embodiment, the first data may include pixel values corresponding to the first region, and the control circuit may calculate an average value of the first data for each line of the at least one raw image. For example, the control circuit may calculate an average value of pixel values corresponding to the first region for each line of the at least one raw image. The control circuit may determine the designated value for the second data included in the line, based on the average value calculated for each line.

According to an embodiment, the second data may be pixel values that do not correspond to the first region, and the control circuit may determine one-pixel value in a pixel value range designated corresponding to the calculated average value for each line as the designated value for the second data included in the line. For example, the control circuit may determine the designated value for the second data included in the first line as a first value, based on at least a part (e.g., an average value of first data included in a first line) of the first data corresponding to the first line of the at least one raw image. The control circuit may determine the designated value for second data included in a second line as a second value, based on at least a part (e.g., an average value of the second data included in the second line) of the second data corresponding to the second line of the at least one raw image.

In operation 1440, the control circuit may determine whether there is a next line among the plurality of lines of the at least one raw image in which the designated value for the second data is not determined. When determining in operation 1440 that there is a next line among the plurality of lines of the at least one raw image in which the designated value for the second data is not determined, the control circuit may perform operation 1410; when determining that there is not the next line, the control circuit may perform operation 760 of FIG. 7.

In operation 1450, when first data corresponding to a first region in the at least one raw image is not included in a corresponding line among a plurality of lines of the at least one raw image, the control circuit may determine that the line is second data, and determine the line as the designated value for the second data.

According to an embodiment, the designated value for the second data may be a value input by a user or a value set by default in the electronic device.

Figure 15:
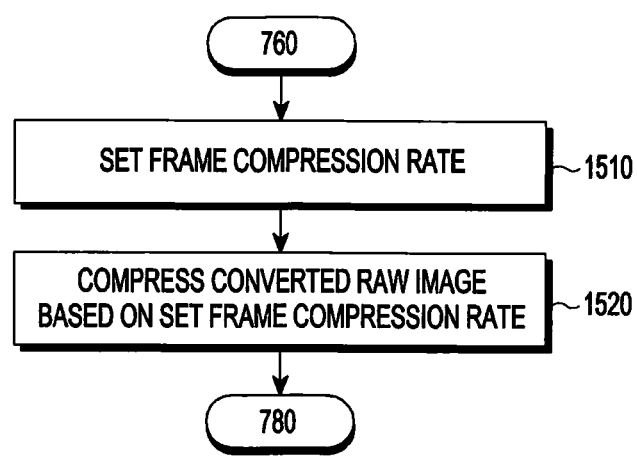
FIG. 15 is a flowchart illustrating an image compression method of an electronic device, according to various embodiments.

FIG. 15 is a flowchart illustrating an image compression method of an electronic device, according to various embodiments. FIG. 15 is a detailed flowchart illustrating a method of compressing at least one raw image shown in operation 770 shown in FIG. 7, in which the method may be performed by at least one of an electronic device (e.g., the electronic device 301) or a processor (e.g., the control circuit 319) of the electronic device.

In operation 1510, for example, the control circuit may set a frame compression rate for at least one converted raw image including first data corresponding to a first region in the at least one raw image and second data corresponding to a second region except for the first region, in which the second data is changed into a designated value, or at least one normal raw image in which the second data is not changed into the designated value. For example, the compression rate may be expressed by dividing a size of non-compressed data by a size of compressed data.

In operation 1520, for example, the control circuit may compress the at least one raw image (e.g., the converted raw image or normal raw image) based on the set frame compression rate.

According to an embodiment, the control circuit may set the same frame compression rate for the normal raw image and the converted raw image among the at least one raw image.

According to an embodiment, the control circuit may set different frame compression rates for the normal raw image and the converted raw image among the at least one raw image.

According to an embodiment, the control circuit may compress the converted raw image of the normal raw image frame-by-frame according to the set frame compression rate. The converted raw image or normal raw image compressed frame-by-frame may be transmitted to the processor based on a speed of an interface (e.g., the I/F 317) of the image sensing module.

Figure 16:
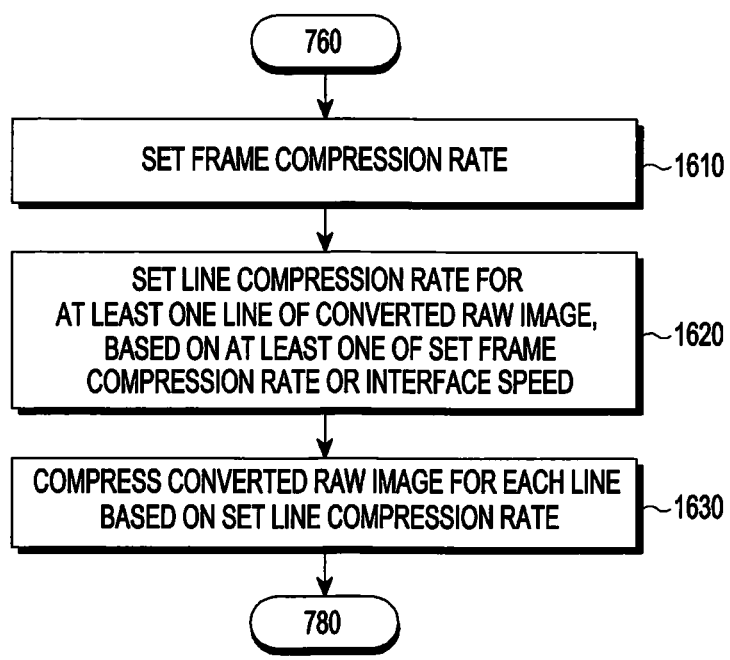
FIG. 16 is a flowchart illustrating an image compression method of an electronic device, according to various embodiments.

FIG. 16 is a flowchart illustrating an image compression method of an electronic device, according to various embodiments. FIG. 16 is a detailed flowchart illustrating a method of compressing at least one raw image shown in operation 770 shown in FIG. 7, in which the method may be performed by at least one of an electronic device (e.g., the electronic device 301) or a processor (e.g., the control circuit 319) of the electronic device.

In operation 1610, for example, the control circuit may set a frame compression rate for at least one converted raw image including first data corresponding to a first region in the at least one raw image and second data corresponding to a second region except for the first region, in which the second data is changed into a designated value, or at least one normal raw image in which the second data is not changed into the designated value. For example, the compression rate may be expressed by dividing a size of non-compressed data by a size of compressed data.

According to an embodiment, the control circuit may set the same frame compression rate for the normal raw image and the converted raw image among the at least one raw image.

According to an embodiment, the control circuit may set different frame compression rates for the normal raw image and the converted raw image among the at least one raw image.

In operation 1620, the control circuit may set a line compression rate for at least one line of the converted at least one raw image, based on at least one of the set frame compression rate, the interface speed of the image sensing module, or the interface speed of the processor.

According to an embodiment, the line compression rate may differ with a line.

In operation 1630, for example, the control circuit may compress the converted at least one raw image for each line of the converted at least one raw image, based on the set line compression rate.

According to an embodiment, the control circuit may control a compression rate for each line of the converted at least one raw image, thus adjusting a compression rate of each line based on an overall frame compression rate by lowering a compression rate for a line having much data variation and increasing a compression rate for a line having less data variation to avoid a line (e.g., line 5 and line 6 of FIG. 5C) exceeding a target compression rate.

Figure 17:
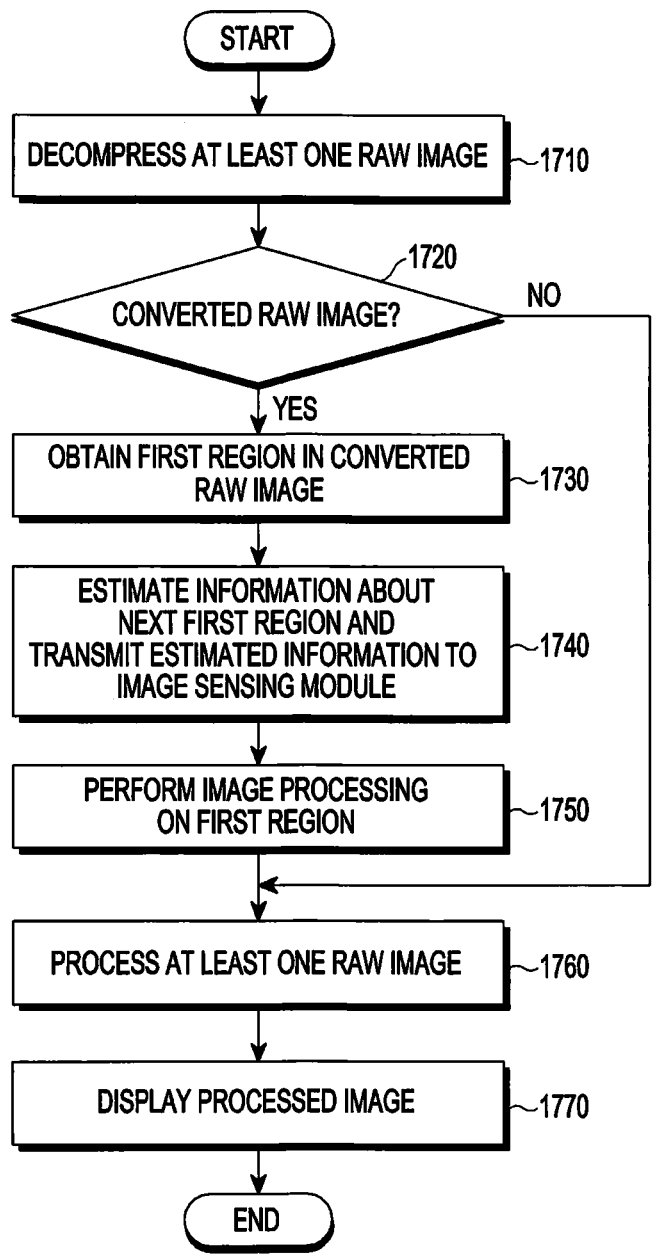
FIG. 17 is a flowchart illustrating an image compression method of an electronic device, according to various embodiments.

FIG. 17 is a flowchart illustrating an image compression method of an electronic device, according to various embodiments. The method may be performed by at least one of the electronic device (e.g., the electronic device 301) or the processor (e.g., the processor 320, the main processor 321, or the auxiliary processor 323) of the electronic device.

In operation 1710, for example, the processor may receive the compressed converted at least one raw image from an image sensing module (e.g., the image sensing module 310) through an interface (i.e., the I/F 327) and decompress the at least one raw image by using a decompressor (e.g., the decompressor 325).

According to an embodiment, the decompressed at least one raw image may include a frame including a plurality of lines.

According to an embodiment, the processor may receive the compressed at least one raw image frame-by-frame or line-by-line, based on an interface speed of an I/F (e.g., the I/F 327) of the processor.

According to an embodiment, the processor may generate the at least one raw image by decompressing the compressed at least one raw image frame-by-frame or line-by-line, using the decompressor.

In operation 1720, for example, the processor may determine whether the decompressed at least one raw image is the converted raw image. When determining in operation 1720 that the decompressed raw image is the converted raw image, the processor may perform operation 1730; when determining that the decompressed raw image is not the converted raw image, the processor may perform operation 1760.

In operation 1730, for example, the processor may obtain a first region (e.g., an ROI) in the converted raw image. For example, the processor may obtain the first region corresponding to the first data from the converted raw image.

According to various embodiments, the first region may be at least one of a region focused by an AF operation performed using the image sensing module, an object region recognized by an object recognition operation in the at least one raw image, a region corresponding to information about a designated region received from the processor in the at least one raw image, a region corresponding to a designated region size in the at least one raw image when a size for the first region is designated based location information received from the processor, or a region corresponding to digital zoom information (e.g., center location information and magnification information).

In operation 1740, for example, the processor may estimate information about a first region (e.g., a next ROI) to be obtained in the image sensing module based on the obtained first region, and transmit the estimated information to the image sensing module. The operation 1740 is optional, and thus may be omitted under control of the processor.

In operation 1750, the processor may perform image processing with respect to the first region in the converted at least one raw image. According to an embodiment, an auxiliary processor (e.g., the auxiliary processor 323) may perform image processing with respect to the first region.

According to an embodiment, the image processing may include gamma correction, interpolation, spatial change, image effect, image scale, auto white balance (AWB), auto exposure (AE), auto focus (AF), etc.

In operation 1760, for example, the processor may process the at least one raw image. According to an embodiment, an auxiliary processor (e.g., the auxiliary processor 323) may perform image processing with respect to the at least one second raw image.

In operation 1770, for example, the processor may display the image-processed at least one raw image on a display device (e.g., the display device 360) of the electronic device.

According to an embodiment, the processor may display the converted at least one raw image that is image-processed by the auxiliary processor 323 (e.g., the ISP 323*a*) or the at least one raw image (the second region (e.g., the non-ROI) except for the first region is not converted) on the display 360.

According to an embodiment, the processor may generate at least one display image based on the image-processed first region and the at least one raw image, and display the at least one display image on the display device.

According to an embodiment, the processor may generate a display image by enlarging the image-processed first region (e.g., a region (e.g., an ROI D of FIG. 5D) corresponding to magnification information of digital zoom in the raw image) according to a magnification of digital zooming in the digital zoom operation.

According to an embodiment, the processor may generate a display image (e.g., an HDR image) by using the short-exposure raw image or the long-exposure raw image to generate the HDR image of the decompressed at least one raw image.

According to various embodiments, an image compression method of an electronic device (e.g., the electronic device 301) includes obtaining at least one raw image by using an image sensor (e.g., the image sensor 313) of the electronic device (e.g., the electronic device 301), designating the at least one raw image as first data corresponding to a first region and second data corresponding to a second region except for the first region, based on information associated with the first region in the at least one raw image, converting the at least one raw image by changing at least a part of the second data into a designated value, and compressing the converted at least one raw image.

According to various embodiments, the image compression method may further include obtaining the first region in the at least one raw image, and the obtaining of the first region may include at least one of obtaining as the first region, a region focused by an auto focus (AF) operation performed using an image sensing module (e.g., the image sensing module 310) of the electronic device 301, obtaining as the first region, an object region recognized by an object recognition operation in the at least one raw image, obtaining as the first region, a region corresponding to information about a designated region received from a processor (e.g., the processor 320) of the electronic device 301 in the at least one raw image, obtaining as the first region, a region corresponding to a designated region size in the at least one raw image when a size for the first region is designated based on information about a location received from the processor 320 of the electronic device 301, or obtaining as the first region, a region corresponding to digital zoom information received from the processor in the at least one raw image.

According to various embodiments, the at least one raw image may be a frame including a plurality of lines, and the converting of the at least one raw image may include changing the second data corresponding to the first line into the first value by determining the designated value for the second data included in the first line as a first value, based on at least a part of the first data corresponding to a first line among the plurality of lines of the at least one raw image, and changing the second data corresponding to the second line of the at least one raw image into a second value by determining the designated value for the second data included in the second line as the second value based on at least a part of the first data corresponding to the second line of the at least one raw image.

According to various embodiments, the at least one raw image may be a frame including a plurality of lines, and the operation of compressing the converted at least one raw image and transmitting the compressed at least one raw image to the processor may include setting a frame compression rate, setting a line compression rate for each line of the converted at least one raw image based on at least one of the set frame compression rate, the interface speed of the image sensing module, or the interface speed of the processor, compressing the converted at least one raw image for each line based on the set line compression rate, and transmitting the at least one raw image compressed for each line to the processor for each line.

The embodiments disclosed herein have been provided for description and understanding of disclosed technical matters, and are not intended to limit the scope of the present disclosure. Therefore, it should be construed that the scope of the present disclosure includes any change or other various embodiments based on the technical spirit of the present disclosure.

The invention claimed is:

1. An electronic device comprising:
    a processor; and
    an image sensing module comprising an image sensor and a control circuit electrically connected with the image sensor and connected with the processor through an interface,
    wherein the control circuit is configured to:
        obtain a raw image by using the image sensor;
        identify a plurality of regions (ROIs) of the raw image and a remaining region except for the plurality of ROIs based on information associated with the plurality of ROIs, wherein at least one first area of the raw image comprises at least part of the plurality of ROIs, and at least one second area of the raw image is included in the remaining region;
        convert the raw image by changing at least one value of at least a part of the remaining region into a designated value and maintaining values of the plurality of ROIs;
        compress each of the at least one first area and the at least one second area in the converted raw image such that compressing rate for the at least one second area including the remaining region in which at least one value of at least a part are changed to the designated value is higher than compressing rate for the at least one first area; and
        transmit the compressed raw image to the processor.

2. The electronic device of claim 1, wherein the raw image comprises a plurality of objects, and wherein the control circuit or the processor is configured to obtain regions corresponding to the plurality of objects as the plurality of ROIs.

3. The electronic device of claim 1, wherein the raw image is used by the processor to obtain additional information and is not used for display by the processor.

4. The electronic device of claim 1, wherein an image attribute of each of the raw image comprises at least one of a position, a resolution, an exposure time, an exposure sensitivity of a lens, or a frame rate, and
wherein at least one image attribute of the raw image is different from another image attribute of other at least one raw image which is used for display.

5. The electronic device of claim 1, wherein the control circuit is configured to obtain as the plurality of ROIs, at least one of regions focused by an auto focus (AF) operation performed using the image sensing module, a plurality of object regions recognized by an object recognition operation in the raw image, regions corresponding to information about designated regions received from the processor in the raw image, regions corresponding to designated region sizes in the raw image based on information about locations received from the processor when a size for the plurality of ROIs is designated, or regions corresponding to digital zoom information received from the processor in the raw image.

6. The electronic device of claim 1, wherein the control circuit is configured to determine the designated value for the remaining data, based on a default value stored in a memory electrically connected with the control circuit or at least a partial value of the plurality of ROIs.

7. The electronic device of claim 1,
wherein the control circuit is configured to determine the designated value for at least part of the at least one first area, based on at least a partial value of at least one ROI included in the at least part of the at least one second area.

8. The electronic device of claim 1, wherein the control circuit is configured to:
set a frame compression rate;
set, based on at least one of the set frame compression rate, an interface speed of the image sensing module, or an interface speed of the processor, a plurality of compression rates for each of the at least one first area and the at least one second area; and
compress the at least one first area and the at least one second area according to the plurality of respective compression rates.

9. An electronic device comprising:
a processor; and
an image sensing module comprising an image sensor and a control circuit electrically connected with the image sensor and connected with the processor through an interface,
wherein the processor is configured to:
receive a compressed raw image from the image sensing module;
decompress the received compressed raw image;
identify whether the decompressed raw image is converted by the image sensing module or not, wherein at least one first area in the compressed raw image is compressed according to a first compressing rate and at least one second area in the compressed raw image is compressed according to a second compressing rate higher than the first compressing rate when the decompressed raw image is converted by the image sensing module;
based on determining that the decompressed raw image is converted by the image sensing module, identify a plurality of region of interests (ROIs) in the decompressed raw image, wherein the at least one first area in the decompressed raw image comprises at least part of the plurality of ROIs and the at least one second area in the decompressed raw image is included in a remaining area of the decompressed raw image except for the plurality of ROIs;
estimate information about a new plurality of ROIs in a next raw image to be obtained by the image sensing module based on the plurality of ROIs; and
transmit the estimated information to the image sensing module,
wherein the remaining area of the decompressed raw image includes less data than the plurality of ROIs.

10. The electronic device of claim 9, wherein the processor is configured to:
obtain the plurality of ROIs;
perform image processing with respect to the plurality of ROIs.

11. The electronic device of claim 10, wherein the processor is configured to obtain additional information based on the decompressed raw image.

12. The electronic device of claim 9,
wherein the estimated information includes information about a designated region, information about a designated location, or digital zoom information.

* * * * *